United States Patent [19]

Dannheim et al.

[11] Patent Number: 5,300,633
[45] Date of Patent: Apr. 5, 1994

[54] WATER-SOLUBLE, FIBER-REACTIVE AZO COMPOUNDS HAVING SUBSTITUTED ISOPROPYL-OR ISOPROPYLENE-SULFONYL GROUP AS WELL AS TRIAZINYL GROUP

[75] Inventors: Jörg Dannheim, Frankfurt am Main; Werner H. Russ, Flörsheim am Main, both of Fed. Rep. of Germany

[73] Assignee: Hoechst Aktiengesellshaft, Frankfurt am Main, Fed. Rep. of Germany

[21] Appl. No.: 880,958

[22] Filed: May 8, 1992

[30] Foreign Application Priority Data

May 11, 1991 [DE] Fed. Rep. of Germany ........ 4115470
Jan. 27, 1992 [DE] Fed. Rep. of Germany ........ 4202162

[51] Int. Cl.$^5$ .................. C09B 62/028; C09B 62/085; C09B 62/825; D06P 1/38; D06P 3/66
[52] U.S. Cl. ..................... 534/638; 534/617; 534/642; 534/635; 534/636; 534/637; 534/632; 534/598; 568/30; 568/36; 568/44; 564/440; 560/231; 560/254; 558/396
[58] Field of Search ................. 534/642, 617, 638

[56] References Cited

U.S. PATENT DOCUMENTS

| | | | |
|---|---|---|---|
| 2,743,267 | 4/1956 | Heyna et al. | 534/642 |
| 3,223,470 | 12/1965 | Boedeker et al. | 534/638 X |
| 5,047,529 | 9/1992 | Patsch et al. | 544/52 |
| 5,227,475 | 7/1993 | Büch et al. | 534/629 |

FOREIGN PATENT DOCUMENTS

| | | | |
|---|---|---|---|
| 0055849 | 10/1968 | Czechoslovakia | 534/642 |
| 0392351 | 10/1990 | European Pat. Off. | 544/52 |
| 4119591 | 12/1992 | Fed. Rep. of Germany | 534/638 |
| 0059136 | 12/1967 | German Democratic Rep. | 534/642 |
| 64-13685 | 5/1966 | Netherlands | 534/642 |
| 90/13604 | 11/1990 | PCT Int'l Appl. | 534/629 |
| 0352070 | 3/1961 | Switzerland | 534/642 |

OTHER PUBLICATIONS

Wolf et al IV, Chemical Abstracts, vol. 65 #15546-15547 (1966).
Venkataraman, "The Chemistry of Synthetic Dyes", vol. VI, pp. 51-52 (1972).

*Primary Examiner*—Floyd D. Higel

[57] ABSTRACT

Azo compounds of the formula $D^o$—N=N—$K^o$, in which $D^o$ is a radical of the formula (2), (2a) or (2b)

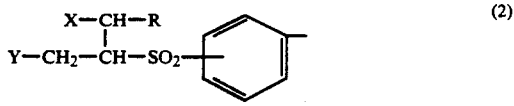

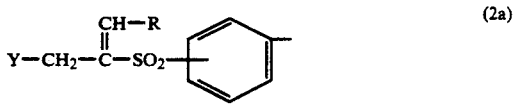

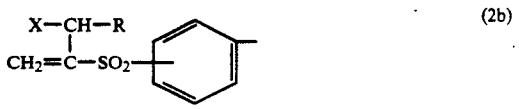

in which Y is a substituent which can be eliminated by alkali to form the vinyl group, X is chlorine or bromine and R is hydrogen, lower alkyl, phenyl or halogen, and $K^o$ is the radical of a coupling component or another radical which contains azo groups, $K^o$ containing a group of the formula —N($R^o$)—Z, in which $R^o$ is hydrogen or lower alkyl and Z is a radical of the formula

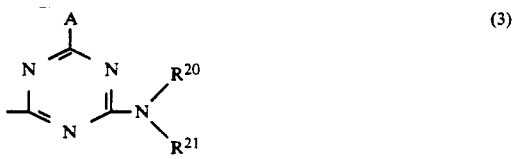

in which A is halogen or cyanoamido, $R^{20}$ is hydrogen or lower alkyl, and $R^{21}$ has one of the meanings given for $R^{20}$, or is an optionally methyl-substituted cycloalkylene radical, or is a phenyl radical, or in which $R^{20}$ and $R^{21}$, together with the nitrogen atom and if appropriate one or two further hetero groups, can form a 5- or 6-membered heterocyclic radical.

The azo compounds are suitable as fiber-reactive dyestuffs for dyeing material containing hydroxy and/or carboxamide groups, such as cellulose fibers, wool and synthetic polyamide fibers.

15 Claims, No Drawings

WATER-SOLUBLE, FIBER-REACTIVE AZO COMPOUNDS HAVING SUBSTITUTED ISOPROPYL-OR ISOPROPYLENE-SULFONYL GROUP AS WELL AS TRIAZINYL GROUP

Novel water-soluble azo compounds corresponding to the formula (1)

$$D^o\text{—}N=N\text{—}K^o \quad (1)$$

which have useful fiber-reactive dyestuff properties have been found.

In this formula (1):

$D^o$ is a radical of the formula (2), (2a) or (2b)

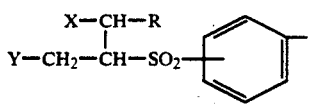

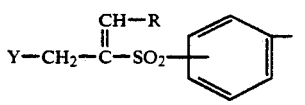

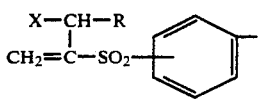

in which

Y is a substituent which can be eliminated by alkali to form the vinyl group, the sulfonyl group preferably being bonded in the meta- or para-position relative to the free bond on the benzene nucleus, X is chlorine or bromine, preferably chlorine, and R is hydrogen, alkyl having 1 to 4 carbon atoms, phenyl or halogen, such as chlorine and bromine, but preferably hydrogen; and $K^o$ is a radical of the formula (2A) or (2B)

in which $R^o$ is hydrogen or alkyl having 1 to 4 carbon atoms, such as ethyl and methyl, preferably hydrogen, Z is a radical of the formula (3)

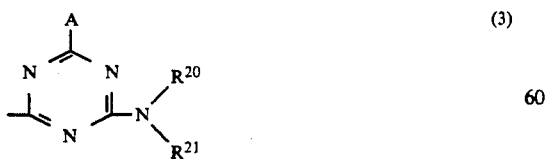

in which

A is halogen or cyanoamido, preferably chlorine or fluorine, in particular fluorine, $R^{20}$ is hydrogen or alkyl having 1 to 4 carbon atoms, such as methyl or ethyl, or is alkyl having 1 to 4 carbon atoms, such as, for example, ethyl, which is substituted by sulfo, carboxy, sulfato, phosphator hydroxy, methoxy, ethoxy, phenyl, monosulfophenyl or disulfophenyl, or is alkyl having 1 to 6 carbon atoms, preferably 2 to 4 carbon atoms, in particular ethyl or n-propyl, which is substituted by a group of the formula —$SO_2$—CH=$CH_2$ or —$SO_2$—$CH_2$—$CH_2$—$Y^1$, which $Y^1$ has one of the meanings given above for Y or is the hydroxy group, or is alkyl having 2 to 8 carbon atoms, which is interrupted by 1 or 2 hetero groups chosen from the group comprising the formulae —O—, —NH— and —N(-$R^o$)—, where $R^o$ has the abovementioned meaning, and is substituted by a group of the formula —$SO_2$—CH=$CH_2$ or —$SO_2$—$CH_2$—$CH_2$—$Y^1$ where $Y^1$ has the abovementioned meaning, and $R^{21}$ is hydrogen or alkyl having 1 to 4 carbon atoms, such as methyl or ethyl, or is alkyl having 1 to 4 carbon atoms, such as, for example, ethyl, which is substituted by sulfo, carboxy, sulfato, phosphato, hydroxy, methoxy, ethoxy, phenyl, monosulfophenyl or disulfophenyl, or is a cycloalkylene having 5 or 6 carbon atoms, which can be substituted by 1, 2 or 3 methyl groups, or is a phenyl radical, which can be substituted by substituents, preferably 1 or 2 substituents, from the group comprising methyl, ethyl, methoxy, ethoxy, chlorine, sulfo and carboxy, or by 1 or 2 of these substituents and by 1 or 2 groups of the formula —$SO_2$—CH=$CH_2$ and/or —$SO_2$—$CH_2$—$CH_2$—$Y^1$, where $Y^1$ has the abovementioned meaning, or by 1 or 2 groups —$SO_2$—CH=$CH_2$ and/or —$SO_2$—$CH_2$—$CH_2$—$Y^1$, or is an alkyl radical having 1 to 6 carbon atoms, preferably having 2 to 6 carbon atoms, in particular ethyl or n-propyl, which is substituted by a group of the formula —$SO_2$—CH=$CH_2$ or —$SO_2$—$CH_2$—$CH_2$—$Y^1$, where $Y^1$ has the abovementioned meaning, or is alkyl having 2 to 8 carbon atoms, which is interrupted by 1 or 2 hetero groups chosen from the group comprising the formulae —O—, —NH— and —N($R^o$)—, where $R^o$ has the abovementioned meaning, and can be substituted by a group of the formula —$SO_2$—CH=$CH_2$ or —$SO_2$—$CH_2$—$CH_2$—$Y^1$, where $Y^1$ has the abovementioned meaning, or $R^{20}$ and $R^{21}$, together with the nitrogen atom, form a 5- or 6-membered heterocyclic radical, which can contain one or two further hetero groups, such as a group of the formula —O—, —S—, —N= or —NH—, such as, for example, the N-piperidino, N-piperazino or N-morpholino radical, E is a radical of the formula (4a), (4b), (4c) or (4d)

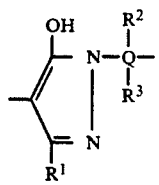 (4a)

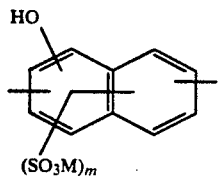 (4b)

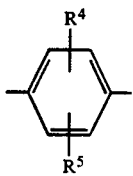 (4c)

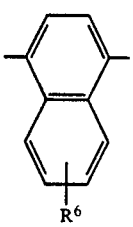 (4d)

in which

R$^1$ is hydrogen, alkyl having 1 to 4 carbon atoms, such as methyl, cyano, carboxy, carbalkoxy having 2 to 5 carbon atoms, such as carbomethoxy and carbethoxy, carbamoyl or phenyl, and is preferably methyl, carboxy, cyano, carbomethoxy or carbethoxy, Q is a benzene or naphthalene ring, R$^2$ is hydrogen, alkyl having 1 to 4 carbon atoms, such as ethyl and in particular methyl, alkoxy having 1 to 4 carbon atoms, such as ethoxy and in particular methoxy, fluorine, bromine, chlorine, sulfo, carboxy, carbalkoxy having 2 to 5 carbon atoms, such as carbomethoxy and carbethoxy, trifluoromethyl, carbamoyl or N-(C$_1$-C$_4$-alkyl) -carbamoyl, preferably hydrogen, methoxy, ethoxy, methyl or chlorine, if Q is a benzene ring, or R$^2$ is hydrogen or sulfo, if Q is a naphthalene ring, R$^3$ is hydrogen, alkyl having 1 to 4 carbon atoms, such as ethyl and in particular methyl, alkoxy having 1 to 4 carbon atoms, such as ethoxy and in particular methoxy, chlorine or sulfo, preferably hydrogen, methoxy, ethoxy or methyl, if Q is a benzene ring, or is hydrogen or sulfo, if Q is a naphthalene ring, R$^4$ is hydrogen, alkyl having 1 to 4 carbon atoms, such as ethyl and in particular methyl, alkoxy having 1 to 4 carbon atoms, such as ethoxy and in particular methoxy, bromine, chlorine, trifluoromethyl, sulfo, carboxy or cyano, preferably hydrogen, methyl, methoxy or sulfo, R$^5$ is hydrogen, alkyl having 1 to 4 carbon atoms, such as ethyl and in particular methyl, alkoxy having 1 to 4 carbon atoms, such as ethoxy and in particular methoxy, chlorine, amino, alkylamino having 1 to 4 carbon atoms, such as ethylamino, alkanoylamino having 2 to 5 carbon atoms, such as acetylamino and propionylamino, benzoylamino, ureido, N'-phenylureido, N'-(C$_1$-C$_4$-alkyl) -ureido, phenylsulfonyl or alkylsulfonyl having 1 to 4 carbon atoms, such as ethylsulfonyl and methylsulfonyl, and preferably acetylamino, methyl, ureido or hydrogen, R$^6$ is hydrogen or sulfo, M is hydrogen or an alkali metal, such as sodium, potassium or lithium, m is the number 1 or 2, v is the number zero or 1 and —K—N(R$^o$)— is the bivalent radical of a water-soluble coupling component, such as, for example, a radical of the formula (5a), (5b), (5c), (5d), (5e), (5f), (5g), (5h) or (5i)

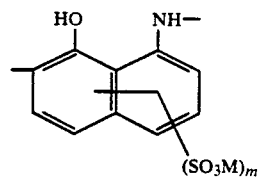 (5a)

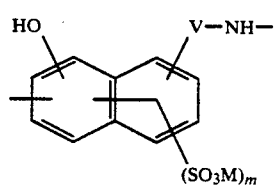 (5b)

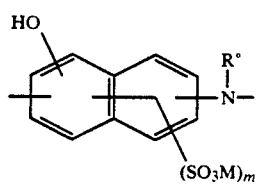 (5c)

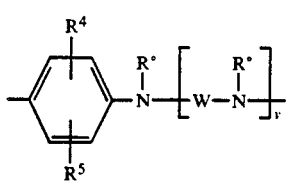 (5d)

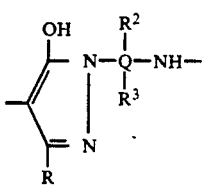 (5e)

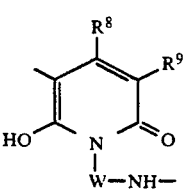 (5f)

-continued

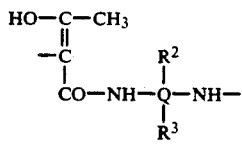
(5g)

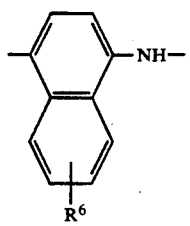
(5h)

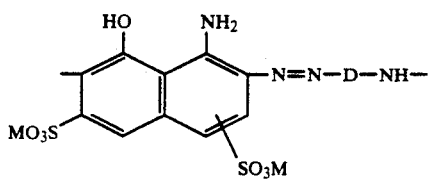
(5i)

in which
M, m, Q, D, R, $R^o$, $R^1$, $R^2$, $R^3$, $R^4$, $R^5$, $R^6$ and v have one of the abovementioned meanings, V is a direct covalent bond or a radical of the formula —NH—CO-phenylene, —NH—CO—NH-phenylene, —N(CH$_3$)—CO-phenylene, —N(CH$_3$)—CO—NH-phenylene, —N(C$_2$H$_5$)—CO-phenylene, —N(C$_2$H$_5$)—CO—NH-phenylene or —NH-phenylene, W is a phenylene radical, which can be substituted by 1 or 2 substituents from the group comprising alkyl having 1 to 4 carbon atoms, such as ethyl and in particular methyl, alkoxy having 1 to 4 carbon atoms, such as ethoxy and in particular methoxy, chlorine, carboxy and sulfo, or is an alkylene having 1 to 6 carbon atoms, preferably 1 to 4 carbon atoms, such as, for example, ethylene, or is an alkylene-phenylene with an alkylene having 2 to 4 carbon atoms, such as, for example, the methylene-phenylene or ethylene-phenylene radical, $R^8$ is hydrogen, alkyl having 1 to 4 carbon atoms, such as methyl, alkoxy having 1 to 4 carbon atoms, such as methoxy, phenyl or cyano-substituted alkyl having 1 to 4 carbon atoms and $R^9$ is hydrogen, sulfo, sulfoalkyl having 1 to 4 carbon atoms, such as sulfomethyl, cyano or carbamoyl, G is a 1-amino-8-hydroxy-3,6— or -4,6-disulfonaphth-2,7-ylene radical or a 1,3-phenylene radical, which is substituted by a hydroxy or by an amino group and can also additionally be substituted by sulfo, alkyl having 1 to 4 carbon atoms, such as methyl and ethyl, hydroxy and/or amino, or is a 1,8-dihydroxy-3,6- or -4,6-disulfo-naphth-2,7-ylene radical, and D is a radical of the formula (6)

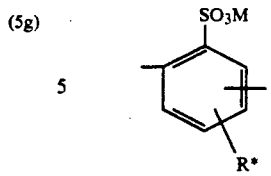
(6)

in which
M has one of the abovementioned meanings and
R* is hydrogen, sulfo or alkyl having 1 to 4 carbon atoms, such as ethyl and in particular methyl.

The individual formula members, including those which also occur twice in one and the same formula, can have meanings which are identical to one another or different from one another.

Substituents Y and $Y^1$ which can be eliminated under alkaline conditions are, for example, halogen, such as bromine and chlorine, cyano, trialkylammonium with alkyl having in each case 1 to 4 carbon atoms, such as trimethylammonium and triethylammonium, ester groups of organic carboxylic and sulfonic acids, such as alkanoyloxy having 2 to 5 carbon atoms, and of this, for example, acetyloxy, or sulfobenzoyloxy, benzoyloxy, phenylsulfonyloxy and toluylsulfonyloxy, phosphato, sulfato and thiosulfato. Y is preferably sulfato and in particular chlorine, and $Y^1$ is preferably chlorine or sulfato.

$R^{20}$ is preferably hydrogen or alkyl having 1 to 4 carbon atoms, which can be substituted by sulfo, carboxy, sulfato or hydroxy, or is ethyl, n-propyl, β-ethoxy-ethyl, γ-ethoxy-propyl, β-propoxy-ethyl or γ-propoxy-propyl, which are substituted by vinylsulfonyl, β-sulfatoethylsulfonyl or β-chloroethylsulfonyl, and $R^{21}$ preferably has one of the meanings given for $R^{20}$, preferably the same meaning, or is cyclohexyl, phenyl or phenyl which is substituted by one or two substituents from the group comprising chlorine, sulfo, carboxy, methyl, methoxy, ethyl and ethoxy and/or by a group of the formula —SO$_2$—CH$_2$—CH$_2$—$Y^1$, where $Y^1$ has the above-mentioned particularly preferred meaning.

G is preferably the 1-amino-8-hydroxy-4,6-disulfo-naphth-2,7-ylene radical, and particularly preferably the 1-amino-8-hydroxy-3,6-disulfo-naphth-2,7-ylene radical.

The formula radical E is to be interpreted as the radical of a compound corresponding to the formula H—E—NH$_2$ which is capable of a coupling reaction and can be diazotized.

In the formulae (4b), (5b) and (5c), the hydroxy group and the free bond in the same aromatic nucleus are in each case in the ortho-position relative to one another. The hydroxy group is preferably bonded to the naphthalene radical in the α-position.

Alkyl groups having 1 to 4 carbon atoms are preferably the ethyl and in particular the methyl group; alkoxy groups having 1 to 4 carbon atoms are preferably the ethoxy and in particular the methoxy group; alkanoylamino groups having 2 to 5 carbon atoms are preferably the propionylamino group and in particular the acetylamino group, and carbalkoxy groups having 2 to 5 carbon atoms are preferably the carbomethoxy and carbethoxy group.

The "sulfo", "carboxy", "phosphato", "thiosulfato" and "sulfato" groups mentioned above or below include both the acid form thereof and the salt form thereof. Accordingly, sulfo groups are groups corresponding to the formula —$SO_3M$, carboxy groups are groups corresponding to the formula —COOM, phosphato groups are groups corresponding to the formula —$OPO_3M_2$, thiosulfato groups are groups corresponding to the formula —S—$SO_3M$ and sulfato groups are groups corresponding to the formula —$OSO_3M$, where M in each case has the abovementioned meaning.

Preferred azo compounds of the formula (1) where the radical $K^o$ has the formula (2A) are, in particular, those in which the radical $K^o$ is one of the radicals of the formulae (7a) to (7h)

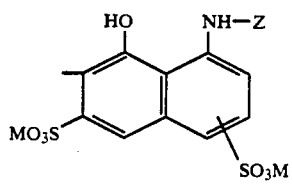
(7a)

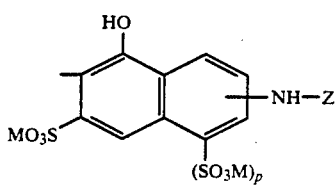
(7b)

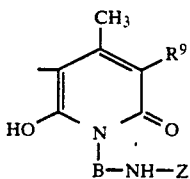
(7c)

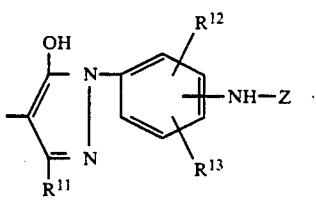
(7d)

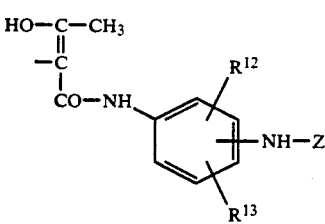
(7e)

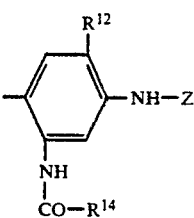
(7f)

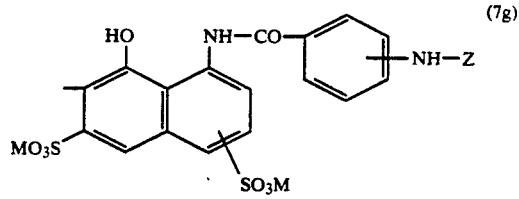
(7g)

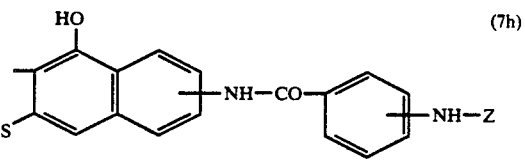
(7h)

in which

M, $R^9$ and Z have one of the abovementioned, particularly preferred meanings,

P is the number zero or 1 (this group being hydrogen in the case where p is zero), B is alkylene having 2 to 4 carbon atoms or phenylene, $R^{11}$ is carboxy, methyl or carbethoxy, $R^{12}$ is hydrogen, methyl, methoxy, sulfo or chlorine, $R^{13}$ is hydrogen, methyl or methoxy, $R^{14}$ is methyl or amino and the amino group in the formulae (7b) and (7h) is in the 2- or 3-position of the 8-naphthol radical.

Of these, radicals of the formulae (7a), (7b), (7d) and (7f) are particularly preferred.

Preferred azo compounds according to the invention are those which result from the combinations of the formula radicals $D^o$ with the radicals of the formulae (5a) to (5i) and, optionally, with the radicals of the formulae (4a) to (4d), with inclusion of the radical Z.

Particularly preferred azo compounds are those which correspond to the formulae (1A) to (1J)

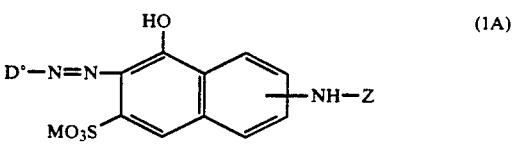
(1A)

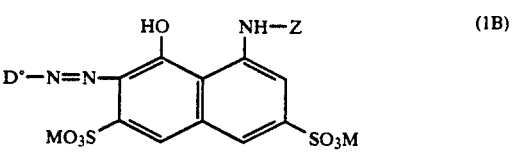
(1B)

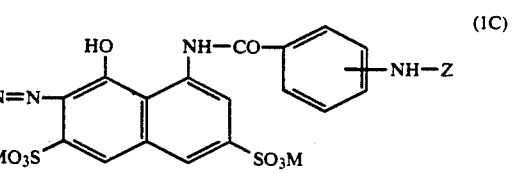
(1C)

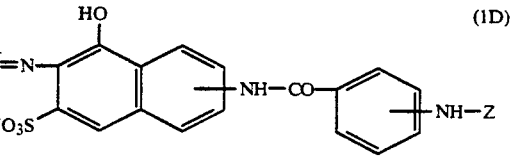
(1D)

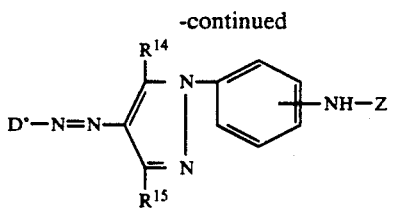
(1E)

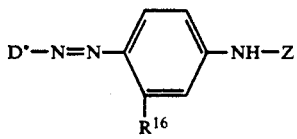
(1F)

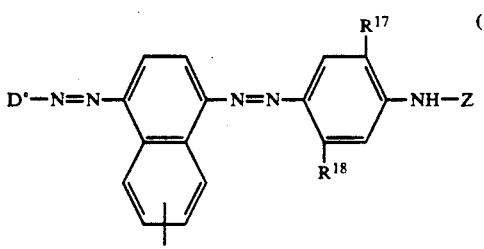
(1G)

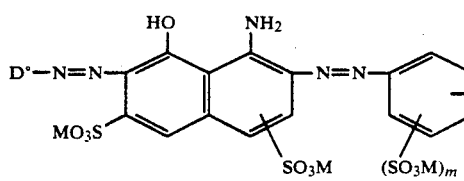
(1H)

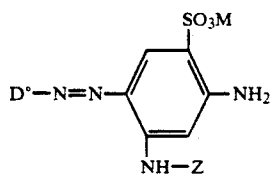
(1J)

in which
D°, M and Z have one of the abovementioned, particularly preferred meanings,
$R^{14}$ is hydroxy or amino, preferably hydroxy,
$R^{15}$ is methyl, carboxy, carbomethoxy or carbethoxy, preferably methyl or carboxy,
$R^{16}$ is acetylamino, ureido or methyl,
$R^{17}$ is hydrogen, alkyl having 1 to 4 carbon atoms, such as methyl and ethyl, alkoxy having 1 to 4 carbon atoms, such as methoxy and ethoxy, or halogen, such as bromine and in particular chlorine, preferably hydrogen, methyl, ethyl, methoxy, ethoxy or chlorine,
$R^{18}$ is hydrogen or alkyl having 1 to 4 carbon atoms, such as methyl and ethyl, alkanoylamino having 2 to 5 carbon atoms, such as acetylamino and propionylamino, or ureido, preferably hydrogen, methyl, ethyl, methoxy, ethoxy, acetylamino or ureido, and
the amino groupings in the formulae (1A) and (1D) are in the 2- or 3-position of the 8-naphthol radical.

The present invention furthermore relates to processes for the preparation of the azo compounds of the formula (1) according to the invention, which comprise, in the case where K° is a radical of the formula (2A), coupling the diazonium compound of an amine of the formula (8)

(8)

in which E and v have the abovementioned meanings and $D^1$ is a radical of the formula (2c), (2d) or (2e)

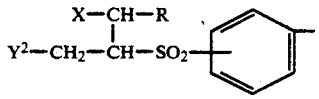
(2c)

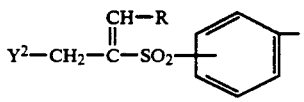
(2d)

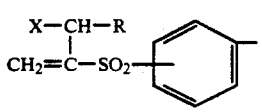
(2e)

in which $Y^2$ has one of the meanings of Y, or is the hydroxy group, and here is preferably chlorine, bromine, acetyloxy or sulfato, and particularly preferably chlorine, bromine or acetyloxy, with a compound of the formula H—K—N(R°)—Z, where K, R° and Z have the abovementioned meaning, or reacting a compound of the formula (9)

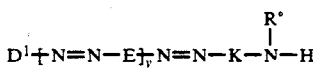
(9)

in which $D^1$, E, v, K and R° have the abovementioned meanings, with a compound of the formula Hal-Z, in which Hal is halogen, such as chlorine or fluorine, and Z has one of the abovementioned meanings, or reacting a compound of the formula (10)

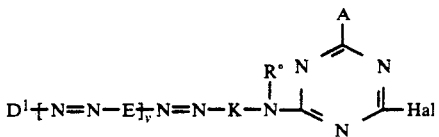
(10)

in which $D^1$, A, E, v, K, R° and Hal have one of the abovementioned meanings, with a compound of the formula $HNR^{20}R^{21}$, where $R^{20}$ and $R^{21}$ have the abovementioned meaning, in equivalent amounts, and, in the case where K° is a radical of the formula (2B), coupling a compound of the formula (11)

(11)

in which $D^1$ has the abovementioned meaning and $G^1$ is an aminophenyl or hydroxyphenyl radical, both of which can be substituted by sulfo, alkyl having 1 to 4 carbon atoms, hydroxy and/or amino, or is the 1,8-dihydroxy-3,6- or -4,6-disulfo-naphth-2-yl or -naphth-7-yl radical or the 1-amino-8-hydroxy-3,6- or -4,6-disulfo-naphth-2-yl radical, with the diazonium compound of an amine of the formula (12)

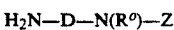
(12)

in which D, R° and Z have one of the abovementioned meanings, or reacting a compound of the formula (13)

$$D^1-N=N-G-N=N-D-N(R^o)-H \quad (13)$$

in which $D^1$, D, G and $R^o$ have one of the abovementioned meanings, with a compound of the formula Hal-Z, where Hal and Z have the abovementioned meaning, or reacting a compound of the formula (14)

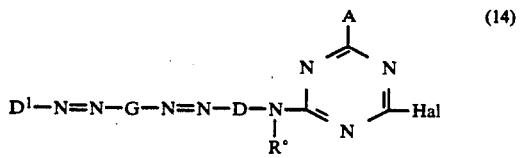
(14)

in which $D^1$, D, A, G and $R^o$ have the abovementioned meanings and Hal is as defined above, with a compound of the formula $HNR^{20}R^{21}$, where $R^{20}$ and $R^{21}$ have the above-mentioned meaning, in equivalent amounts, and in the cases where a compound of the formula (2c) or (2d) where $Y^2$ is a hydroxy group is used, this hydroxy group in the azo compound formed is converted into a group Y of the azo compound of the formula (1) according to the invention, as also mentioned later.

The diazotization and coupling reactions of the process according to the invention are carried out in a customary and well-known manner; thus the diazotization is as a rule carried out at a temperature of between $-5°$ C. and $+15°$ C. and a pH below 2 by means of a strong acid and an alkali metal nitrite in a preferably aqueous medium, and the coupling reaction is as a rule carried out at a pH of between 1 and 4.5 in the case of a coupling component containing an amino group and at a pH of between 3 and 7.5 in the case of a coupling component containing a hydroxy group, at a temperature of between 0° and 35° C. in a preferably aqueous medium.

The starting compounds of the formula (8) where v is 1 are prepared in the known manner of the diazotization and coupling reaction of the amine of the formula $D^o-NH_2$ as the diazo component and the compound of the formula $H-E-NH_2$ as the coupling component. The azo compounds of the formula (11) are synthesized in the same manner by coupling of the diazonium salt of the amine of the formula $D^o-NH_2$ with the compound of the formula $H-G-H$, such as, for example, 1-amino-8-naphthol-3,6- or -4,6-disulfonic acid or an aniline, analogously to known procedures in a strongly acid medium, or if G is a hydroxyphenylene radical, in a neutral to weakly alkaline medium.

The starting compounds corresponding to the formula $D-NH_2$, the formula $H-K-NH_2$, the formula $H-E-NH_2$ and the formula $HNR^{20}R^{21}$ are known and are described in numerous instances in the literature.

The condensation reaction between an amino starting compound of the formula (9) or (13) and a compound of the formula Hal-Z is carried out in the customary manner of the reaction of an amino compound with a triazine radical containing a reactive halogen atom, i.e. in an aqueous-organic medium, particularly preferably in an aqueous medium, and preferably in the presence of a dispersing agent with addition of an acid-binding agent, such as an alkali metal carbonate or alkaline earth metal carbonate, alkali metal bicarbonate or hydroxide or alkaline earth metal bicarbonate or hydroxide or alkali metal acetate, the alkali metals and alkaline earth metals preferably being sodium, potassium or calcium. Acid-binding agents are likewise tertiary amines, such as, for example, pyridine, triethylamine or quinoline. If these condensation reactions are carried out in an organic or aqueous-organic medium, the organic solvent (portion) is acetone, dioxane or dimethylformamide.

The condensation reactions between these amino compounds and the compound Hal-Z are as a rule carried out at a temperature of between 20° C. and 80° C., preferably between 30° C. and 60° C., at a pH of between 2 and 5, preferably between 2.5 and 4. In particular, the reaction with a compound Hal-Z, where Hal and A are each a fluorine atom, is preferably carried out at a pH of between 4 and 5 at a temperature of between 5° C. and 20° C., and the reaction with a compound Hal-Z, where Hal and A are each a chlorine atom, is preferably carried out at a pH of between 2 and 4 at a temperature of between 0° C. and 40° C. The reactions of an amino starting compound of the formula (9) or (13) with a compound of the formula (15)

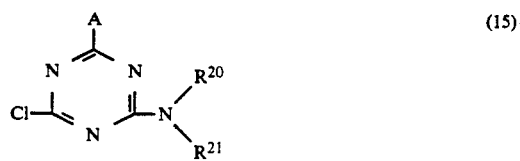
(15)

in which $R^{20}$ and $R^{21}$ have one of the abovementioned meanings and A is the cyanoamido group, are preferably carried out at a temperature of between 40° C. and 80° C. and at a pH of between 2 and 4.

The condensation reactions between a compound corresponding to the formulae (10) or (14) and an amino compound of the formula $HNR^{20}R^{21}$ of the abovementioned meaning are likewise carried out analogously to known procedures on such halogen-triazinylamino compounds with amines, i.e. also in the abovementioned reaction media using an acid-binding agent. The reaction is as a rule carried out at a temperature of between 10° and 60° C., preferably between 20° and 40° C. Preferably, the reaction with starting compounds in which Hal and A are both a chlorine atom is carried out at a temperature of between 30° and 40° C. at a pH of between 4.0 and 6.5, and the reaction with starting compounds in which Hal and A are both a fluorine atom is carried out at a temperature of between 5° and 20° C. at a pH of between 3 and 7. Starting compounds of the formula (10) or (14) in which Hal is a chlorine atom and A is the cyanoamido group are preferably reacted with the amino compounds of the formula $HNR^{20}R^{21}$ at a pH of between 2 and 5 at a temperature of between 40° and 80° C. The reactions of the compounds (10) or (14) in which Hal is a fluorine atom and A is the cyanoamido group with the amines $HNR^{20}R^{21}$ is preferably carried out at a temperature of between 20° and 60° C. at a pH of between 4 and 6.

All these reaction possibilities are analogous to the synthesis methods known in the literature or familiar to the expert.

Starting compounds of the formula $H-E-NH_2$ are, for example, aniline, 3-methyl-aniline, 3-chloro-aniline, 2,5-dimethyl-aniline, 2,5-dimethoxy-aniline, 3-methoxy-aniline, 3-methyl-6-methoxy-aniline, 3-ureido-aniline, 3-acetylamino-6-methyl-aniline, 2-amino-4-acetylamino-benzene-1-sulfonic acid, 1-aminonaphthalene, 1-aminonaphthalene-6- or -7- or -8-sulfonic acid, 3-acetylamino-aniline, 2-methyl-aniline, 2-methoxy-aniline, 3-benzoyl-amino-aniline, 2,3-dimethyl-aniline, 3,5- dimethyl-aniline, 2-methoxy-5-acetylamino-aniline, 2-chloro-6-methyl-aniline, 5-chloro-2-methyl-aniline, 2,6-dichloro-3-methyl-aniline and 2-methoxy-5-methyl-aniline.

Coupling components corresponding to the formula H—K—NH—Z are, for example, 1-(4', 6'-dichloro-1', 3', 5'-triazin-2'-yl)-amino-8-naphthol-4,6- or -3,6-disulfonic acid, 2-or 3-(4',6'-dichloro-s-triazin-2'-yl)-amino-8-naphthol-6-sulfonic acid, 1-[2'-fluoro-4'-(4''-sulfophenylamino)-s-triazin-6'-yl]-amino-8-naphthol-6-sulfonic acid, 1-[2'-fluoro-4'-(β-sulfoethylamino)-s-triazin-6'-yl]-amino-8-naphthol-6-sulfonic acid, 2-[2'-sulfo-5'-(4'',6''-dichloro-s-triazin-2''-yl) -amino-phenylazo]-1-amino-8-naphthol-3,6-disulfonic acid, 2-[2'-sulfo-4'-(4'',6''-dichloro-s-triazin-2''-yl) -amino-phenylazo]-1-amino -8-naphthol-3,6-disulfonic acid, 1-[4'-(4'',6''-dichloro-2-triazin-2''-yl)-amino]phenyl-3-methyl- or -3-carboxy-5-pyrazolone and 4-methyl-1-[β-(4',6'-dichloro-s-triazin-2'-yl)-amino-ethyl]-6-hydroxy-2-pyridone.

Starting compounds of the formula H—K—NH₂ are, for example, 1-(3'- or 4'-aminophenyl)-3-carboxy-5-pyrazolone, 1-(2'-sulfo-5'-aminophenyl)-3-carboxy-5-pyrazolone, 1-(4'-amino-2'-sulfo-phenyl) -3-carboxy-5-pyrazolone, 1-(4'-amino-2'-sulfo-phenyl)-3-carbethoxy-5-pyrazolone, 1-(3'-amino-6'-methyl-phenyl)-3-carboxy-5-pyrazolone, 1-(2'-methoxy-5'-aminophenyl)-3-carboxy-5-pyrazolone, 1-(3'- or 4'-aminophenyl)-3-methyl-5-pyrazolone, 1-(6'-amino-4',8-disulfo-naphth-2'-yl)-3-carboxy-5-pyrazolone, 1-amino-3,6- or -4,6-disulfo-8-naphthol, 2-amino-6-sulfo-8-naphthol, 3-amino-6-sulfo-8-naphthol, 1-amino-4-sulfo-8-naphthol, 1-amino-2,4-disulfo-8-naphthol, 2-amino-4,6-disulfo-8-naphthol, 3-amino-4,6-disulfo-8-naphthol, 3-methyl-aniline, 3-chloro-aniline, 2,5-dimethyl-aniline, 2,5-dimethoxy-aniline, aniline, 3-methoxy-aniline, 3-methyl-6-methoxy-aniline, 3-ureido-aniline, 3-acetylamino-6-methyl-aniline, 2-amino-4-acetylamino-benzene-1-sulfonic acid, 1-aminonaphthalene, 1-aminonaphthalene-6- or -7- or -8-sulfonic acid, 2-(methylamino)-6-sulfo-8-naphthol, 1-amino-3,6-disulfo-2-(phenylazo)-8-naphthol, 1-amino-3,6-disulfo-2-(4'-sulfophenylazo)-8-naphthol, 1-amino-3,6-disulfo-2-(2',5'-disulfo-phenylazo)-8-naphthol, 1,3-diaminobenzene, 1-amino-3-[N,N-di-(β-hydroxyethyl)-amino]-benzene, 1-amino-3-[N,N-di-(β-sulfatoethyl)-amino]-benzene, 1-amino-3-[N,N-di-(β-hydroxyethyl)-amino]-4-methoxy-benzene, 1-amino-3-[N,N-di-(β-sulfatoethyl)-amino]-4-methoxy-benzene, 1-amino-3-(sulfobenzylamino)-benzene, 1-amino-3-(sulfobenzylamino)-4-chloro-benzene, 1-amino-3-[N,N-di-(sulfobenzyl)-amino]-benzene, 1,3-diamino-benzene-4-sulfonic acid, 1-amino-2-methoxy-6-sulfo-naphthalene, 1-amino-5,7-disulfo-naphthalene, 1-amino-6-sulfo-8-naphthol, 1-amino-2,4,6-trisulfo-8-naphthol, 3-acetylamino-aniline, 2-methyl-aniline, 2-methoxy-aniline, 3-benzoylamino-aniline, 2,3-dimethyl-aniline, 3,5-dimethylaniline, 2-methoxy-5-acetylamino-aniline, 2-chloro-6-methyl-aniline, 5-chloro-2-methyl-aniline, 2,6-dichloro-3-methylaniline and 2-methoxy-5-methyl-aniline.

Compounds of the formula H—G—H which can be used as bivalent coupling components for the preparation of the disazo compounds of the formula (1) with the radical of the formula (2B) are, for example, 1,3-diaminobenzene, 1,3-diaminobenzene-5-sulfonic acid, resorcinol, 1,8-dihydroxynaphthalene-3,6-disulfonic acid, 1-amino-8-naphthol-3,6-disulfonic acid and 1-amino-8-naphthol-4,6-disulfonic acid.

Amino compounds of the formula $HNR^{20}R^{21}$ which can be used for the preparation of the azo compounds according to the invention are, for example, 3-sulfo-aniline, 4-sulfo-aniline, 2-sulfo-aniline, 2,5-disulfo-aniline, 4-carboxy-aniline, 3-carboxy-aniline, 2,6-disulfo-4-methyl-aniline, 2-aminonaphthalene-1-sulfonic acid, taurine, N-methyl-taurine, diethanolamine, morpholine, 3-aminophenyl-phosphonic acid, glycine, 4-(β-sulfatoethylsulfonyl)-aniline, 3-(β-sulfatoethylsulfonyl)-aniline, β-(β'-sulfatoethylsulfonyl)-ethylamine and γ-(β'-sulfatoethyl-sulfonyl)-propylamine.

The compounds which can be employed according to the invention for the synthesis of the azo compounds (1) according to the invention and correspond to the formula $D^1$—$NH_2$, where $D^1$ is a radical of the formula (2c), (2d) or (2e) have not yet been disclosed. They can be prepared by oxidizing a compound of the formula (16)

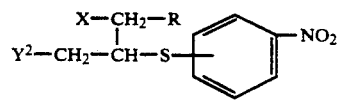

(16)

in which $Y^2$, X and R have one of the abovementioned meanings, and in which $Y^2$ is particularly preferably chlorine, bromine, alkanoyloxy having 2 to 5 carbon atoms, such as acetyloxy, or cyano, to give the sulfonyl compound, the oxidizing agent used being, for example, potassium permanganate, sodium perhydrogen sulfate or potassium perhydrogen sulfate, organic peracids, such as, for example, peroxyacetic acid, sodium peroxide, hydrogen peroxide and chlorine in aqueous solution. The oxidation reaction can be carried out at a temperature of between 10° and 100° C., preferably between 50° and 90° C. The oxidation of a compound of the formula (16) to give the corresponding sulfonyl compound of the formula (17) described below is preferably carried out in an aqueous-organic or in a purely organic medium, the organic solvents employed being those which are water-soluble and water-miscible and inert toward the oxidizing agents. Such organic solvents are, for example, glacial acetic acid and dioxane. Glacial acetic acid, in particular as a mixture with water, is preferably used. The oxidation reaction can be carried out, for example, by means of hydrogen peroxide in anhydrous acetic acid or in aqueous acetic acid having a water content of up to 20% by weight, at a temperature of between 30° and 100° C., preferably between 60° and 90° C. The hydrogen peroxide content is as a rule between 10 and 35% by weight, preferably between 20 and 35% by weight.

The compounds thus obtainable, of the formula (17)

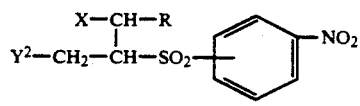

(17)

in which $Y^2$, R and X have the abovementioned meanings, can be reduced to an aniline compound according to the invention of the formula $D^1$—$NH_2$ having the above definition, such as, for example, by catalytic reduction by means of hydrogen in the presence of a customary noble metal catalyst or in an acid, aqueous-organic medium by means of base metals, such as iron or zinc, aqueous hydrochloric acid preferably serving as the aqueous acid medium. The reduction is preferably carried out in an aqueous acid medium or in anhydrous organic solvents, such as, for example, glacial acetic acid, by means of palladium/active charcoal at a temperature of between 10° and 100° C., preferably between 20° and 50° C.

The compounds of the formulae (16) and (17) are likewise novel. They can be summarized, together with the aniline compounds of the formula $D^1$—$NH_2$, under the formula (18)

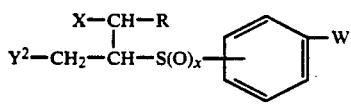
(18)

in which $Y^2$, X and R have the abovementioned meanings, x is the number zero or 2 and W is the nitro or amino group.

The starting compounds of the formula (16) can be prepared by adding a nitrobenzene-sulfenyl halide, preferably in the form of the sulfenyl chloride, onto a compound of the formula (19)

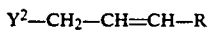
(19)

in which $Y^2$ and R have the abovementioned meanings. The reaction is carried out as described, for example, in J. Org. Chem. 49, 1314 (1984) and J. Chem. Soc. 1968, 1339. In particular, the reaction according to the invention is carried out in inert organic solvents, such as, for example, methylene chloride, carbon tetrachloride, chlorobenzene or the dichlorobenzenes, at a temperature of between $-50°$ C. and 0° C., preferably between $-40°$ C. and $-25°$ C.

The nitrophenyl-sulfenyl halide starting compounds themselves can be prepared by procedures analogous to known procedures (see, for example, Liebigs Ann. 400, 2 (1913)), using a nitrobenzene-thiol or -thiolate or a bis-(nitrophenyl)disulfide as the starting substance and reacting this with a halogenating agent in an inert solvent, such as, for example, methylene chloride, chloroform, carbon tetrachloride, chlorobenzene or a dichlorobenzene or an isomeric dichlorobenzene mixture, preferably in methylene chloride, chloroform, chlorobenzene or dichlorobenzene, at a temperature of between $-80°$ C. and $+20°$ C., preferably between $-50°$ C. and $-20°$ C. Such halogenating agents are preferably chlorine, bromine, N-chloro-succinimide and N-bromo-succinimide.

The nitrobenzene-isopropyl-sulfone compound corresponding to the formula (17), in which $Y^2$ has one of the abovementioned meanings and is preferably a halogen atom, such as bromine and in particular chlorine, the cyano group or an alkanoyloxy group having 2 to 5 carbon atoms, such as the acetyloxy group, can also be prepared in a simple manner by reacting thiophenol with chlorine to give phenylsulfenyl chloride, adding this onto an olefin compound of the formula (19) mentioned and defined above to give the compound of the formula (20)

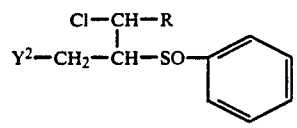
(20)

in which R and $Y^2$ have one of the abovementioned meanings, subsequently oxidizing this compound of the formula (20) by means of hydrogen peroxide to give the compound of the formula (21)

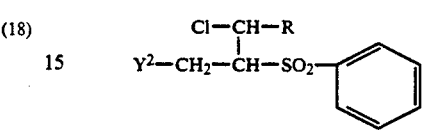
(21)

where R and $Y^2$ have the abovementioned meaning, and then nitrating this analogously to the known procedures of nitration of benzene compounds to give a meta-nitro-benzene-isopropylsulfonyl compound corresponding to the formula (17). The reaction of the thiophenol with chlorine here is carried out at a temperature of between $-20°$ C. and $+20°$ C., preferably between $-10°$ C. and $+10°$ C., in an organic solvent which is inert towards the reactants, preferably a halogen-substituted hydrocarbon, such as, for example, methylene chloride and chlorobenzene. Without the resulting phenylsulfenyl chloride being isolated, it can be reacted in the same batch with the olefin of the formula (19), here also the reaction being carried out in a solvent which is inert towards the reactants, such as, for example, those mentioned above, at a temperature of between $-50°$ C. and 0° C., preferably between $-45°$ C. and $-35°$ C. When the reaction has ended, the solvent is distilled off and the resulting compound of the formula (20) is either purified or subjected directly to the oxidation process. This is likewise carried out in a water-miscible organic solvent which is inert towards the reactants, such as, for example, an alkanecarboxylic acid, preferably such an acid having an alkyl radical of 1 to 4 carbon atoms, such as, in particular, acetic acid, at a temperature of between 50° C. and 100° C., preferably between 60° and 90° C., by means of hydrogen peroxide, which is employed in the reaction as a 10 to 40% strength by weight, preferably 25 to 35% strength by weight, aqueous solution; a customary oxidation catalyst, such as, for example, an alkali metal tungstate, is also used in this reaction. After the oxidation batch has cooled, the resulting compound of the formula (21) can be filtered off from the batch, if appropriate after addition of water. Further purification is no longer necessary. This sulfonyl compound of the formula (2') is then nitrated by means of a so-called nitrating acid, a mixture of concentrated sulfuric acid and nitric acid preferably having a nitric acid content of about 30% by weight, at a temperature of between 30° and 70° C., preferably between 40° and 50° C.

Both the compounds corresponding to the formula (1) and those of the formulae (16), (17) and $D^1$—$NH_2$, in which Y or $Y^2$ and, if appropriate, $Y^1$ denote the hydroxy group, can be converted in a customary and known procedure into compounds in which Y and/or $Y^1$ or $Y^2$ has a meaning other than the hydroxy group, thus, for example, into their ester derivatives, such as, for example, of polybasic inorganic acids or of aliphatic and aromatic carboxylic or sulfonic acids, thus, for example, into compounds in which Y and/or $Y^1$ or $Y^2$ are a chlorine atom or a sulfato, phosphato, acetyloxy or tolylsulfonyloxy group.

Esterification and acylation agents which are suitable for this are, for example, the corresponding inorganic or organic acids or anhydrides thereof, halides or amides, such as, for example, sulfuric acid, sulfuric acid containing sulfur trioxide, chlorosulfonic acid, amidosulfonic acid, phosphoric acid, phosphorus oxychloride, mixtures of phosphoric acid and phosphorus pentoxide, acetic anhydride, toluenesulfonyl chloride and thionyl chloride.

Those compounds having a vinylsulfonyl group can be prepared from their analogous ester derivatives, such as, for example, those in which $Y^2$ is the sulfato group or a chlorine atom, under the action of an alkali, thus in an aqueous medium at a PH of 8 to 10 at a temperature of between 20° and 50° C. in the course of 10 to 20 minutes. In this reaction, under the action of the alkali, both the group $Y^2$ and, as an alternative, the group X can be eliminated, taking a hydrogen atom with it, to form an olefinic bond. The compounds (1) or the starting compounds of the formula $D^1$—$NH_2$ in each case with the radical (2) give, in this manner, those with a radical (2a) or (2b).

The compounds according to the invention of the formula (1)— called compounds (1) below— have fiber-reactive properties and have very useful dyestuff properties. They can therefore be used for dyeing (including printing) materials containing hydroxy groups and/or containing carboxamide groups. For this purpose, the solutions obtained in the synthesis of the compounds (1) can be put to use for dyeing directly as a liquid preparation, if appropriate after addition of a buffer substance and if appropriate also after concentration.

The separation and the isolation of the compounds (1) from the aqueous synthesis solutions can be carried out by generally known methods for water-soluble compounds, thus, for example, by precipitation from the reaction medium by means of an electrolyte, such as, for example, sodium chloride or potassium chloride, or by evaporation of the reaction solution itself, for example by spray drying. If the last type of isolation mentioned is chosen, it is often advisable for any amounts of sulfate present in the solutions to be removed by precipitation as calcium sulfate and separation by means of filtration before the evaporation.

The present invention therefore also relates to the use of the compounds (1) for dyeing (including printing) materials containing hydroxy and/or carboxamide groups, and to processes for their use on these substrates. The materials are preferably used in the form of fiber materials, in particular in the form of textile fibers, such as yarns, wound packages and woven fabrics. The procedure here can be analogous to known procedures. Materials containing hydroxy groups are those of natural or synthetic origin, such as, for example, cellulose fiber materials or regeneration products thereof and polyvinyl alcohols. Cellulose fiber materials are, preferably, cotton, and also other plant fibers, such as linen, hemp, jute and ramie fibers; regenerated cellulose fibers are, for example, staple viscose and filament viscose.

Materials containing carboxamide groups are, for example, synthetic and naturally occurring polyamides and polyurethanes, in particular in the form of fibers, for example wool and other animal hair, silk, leather, polyamide 6,6, polyamide 6, polyamide 11 and polyamide 4.

The compounds (1) can be applied and fixed, in accordance with the use according to the invention, to the substrates mentioned, in particular to the fiber materials mentioned, by the use techniques known for water-soluble, fiber-reactive dyestuffs, thus, for example, by a procedure in which the compound (1) is applied in dissolved form to the substrate or introduced into it and fixed on this or in this by the action of heat or by the action of an alkaline agent or by both measures. Such dyeing and fixing methods are described in numerous instances in the literature (for example in European Patent Application Publication No. 0 181 585 A2).

In particular, the compounds (1) are advantageously distinguished in that when used in the customary dyeing processes, even when electrolytes and alkaline compounds are used in a significantly lower amount than usual, they surprisingly produce dyeings having higher color yields than when customary amounts of salts are used, since as a rule large amounts of electrolyte additions are still needed in the dye liquors in the current state of the art in order to obtain intensive dyeings with the fiber-reactive dyestuffs. For ecological reasons, such high amounts of salt, which are as a rule above 50 g per liter of dye liquor, are undesirable. However, the compounds (1) allow the use of dye liquors in which the electrolyte additions are below 40 g per liter of dye liquor, preferably only between 10 and 35 g per liter of dye liquor.

The dyeings obtainable according to the invention have, especially on cellulose fiber materials, good light-fastnesses both in the dry state of the dyeing and in the wet state, for example the state moistened with a perspiration solution, as well as good wet-fastnesses, such as, for example, good fastnesses to washing at 60° to 95° C., including in the presence of perborates, good fastnesses to acid and alkaline milling, cross-dyeing and perspiration, a high resistance to steam, good fastnesses to alkali, acid, water and sea-water and good fastnesses to pleating, ironing and rubbing. They likewise have a good resistance to storage with acid ("acid fading") when damp, dyed material which still contains acetic acid is stored.

The following Examples serve to illustrate the invention. The parts are parts by weight and the percentage data are percentages by weight, unless noted otherwise. Parts by weight bear the same relation to parts by volume as the kilograin to the liter.

The compounds described by formulae in these Examples are shown in the form of the free acids; in general, they are prepared and isolated in the form of their alkali metal salts, such as lithium, sodium or potassium salts, and used for dyeing in the form of their salts. The starting compounds and components mentioned in the form of the free acid in the following examples, in particular the Tabular Examples, can likewise be employed in the synthesis as such or in the form of their salts, preferably alkali metal salts.

The absorption maxima ($\lambda_{max}$) in the visible range stated for the compounds according to the invention were determined with the aid of the alkali metal salts thereof in aqueous solution. In the Tabular Examples, the $\lambda_{max}$ values are given in parentheses with the color shade; the wavelength shown is in nm.

The $^1$H-NMR spectroscopy data were measured in dimethyl-sulfoxide-$d_6$ as the solvent using tetramethylsilane as the internal standard, unless noted otherwise.

EXAMPLE A

To synthesize 1,3-dichloro-isopropyl-(4'-nitro-phenyl) sulfide, chlorine is passed into a suspension of 100 parts of bis-(4-nitro-phenyl) disulfide in 1000 parts by volume of methylene chloride at −10° C., while cooling, until all the disulfide has dissolved. The mixture is then cooled to −40° C. and 80 parts of allyl chloride are slowly added in the course of about 30 minutes. The mixture is then allowed to warm to 20° C. and is subsequently stirred at this temperature for about 16 hours, and volatile constituents are then removed under reduced pressure.

The resulting residue is recrystallized from diethyl ether. About 122 to 123 parts of the compound of the formula

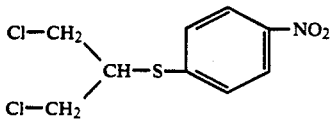

are obtained in the form of pale yellow crystals having a melting point of 62° C.
C,H,N analysis:
calculated: C 40.6%, H 3.4%, N 5.2%,
found: C 40.4%, H 3.4%, N 5.3%.
$^1$H-NMR analysis: 4.0 ppm (4H;d), 4.22 ppm (1H;quintet),
7.65 ppm (2H;d), 8.18 ppm (2H;d).

EXAMPLE B

To prepare 1,3-dichloro-isopropyl-(4'-nitro-phenyl)-sulfone, 13.3 parts of 1,3-dichloro-isopropyl-(4'-nitro-phenyl) sulfide (Example A; in the form of the crude product or after recrystallization) are dissolved in 100 parts by volume of glacial acetic acid, 0.05 part of sodium tungstate is added, the mixture is heated to 80° C. and 11 parts by volume of 35% strength aqueous hydrogen peroxide are slowly added at this temperature, while stirring. The mixture is then subsequently stirred for about a further 15 minutes and the mixture is cooled to 0° C. The crystals which have precipitated are filtered off with suction and recrystallized from ethanol. About 11.5 parts of the compound of the formula

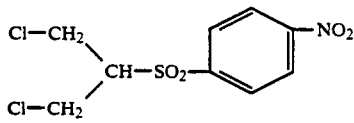

having a melting point of 105° C. are obtained.
C,H,N analysis:
calculated: C 36.25%, H 3.04%, N 4.7%;
found: C 36.3%, H 3.0%, N 4.8%.
$^1$H-NMR analysis: 4.07 ppm (4H;m), 4.5 ppm (1H;m), (in CDCl$_3$): 8.2 ppm (4H;d), 8.45 ppm (4H;d).

EXAMPLE C

To prepare 1,3-dichloro-isopropyl 4-amino-phenyl sulfone, a mixture of 80 parts of zinc powder, 360 parts of water, 160 parts by volume of dioxane and 10 parts by volume of a concentrated aqueous hydrochloric acid is first prepared. A solution of 48 parts of 1,3-dichloro-isopropyl 4-nitro-phenyl sulfone (Example B) in 320 parts by volume of dioxane and a mixture of 310 parts by volume of concentrated aqueous hydrochloric acid, 160 parts of water and 80 parts by volume of dioxane are slowly added simultaneously to this mixture at about 20° C., while stirring thoroughly. The mixture is subsequently stirred for a further period of time, until the zinc has been largely consumed and has dissolved, and the mixture is filtered off from the precipitate and washed with dioxane and the combined filtrates are brought to a pH of 4 by means of sodium acetate. The filtrate is subsequently stirred at about 20° C. for about a further 12 hours and the white precipitate which has separated out is filtered off with suction and dried. About 36 parts of a finely crystalline compound of the formula

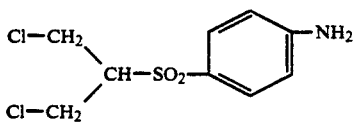

having a melting point of 104° C. are obtained.
Elemental analysis:
calculated: C 40.3%, H 4.1%, N 5.2%, Cl 26.4%;
found: C 40.8%, H 4.2%, N 5.3%, Cl 25.9%.
$^1$H-NMR analysis: 3.95 ppm (5H;m), 6.25 ppm (2H;broad),
6.65 ppm (2H;d), 7.5 ppm (2H;d).

EXAMPLE D

To prepare 1-chloro-3-acetyloxy-isopropyl-(4'-nitrophenyl) sulfide, chlorine is passed into a suspension of 92.4 parts of bis-(4-nitro-phenyl) disulfide in 500 parts by volume of methylene chloride at −10° C. until a clear solution has formed. Dry nitrogen is then passed in for about 15 minutes, and 108 parts by volume of allyl acetate are then slowly added at a temperature of −40° C. in the course of about 15 minutes. The mixture is subsequently stirred for a further hour, the solution is then cooled to 70° C. and the pale yellow precipitate is isolated.

152 parts of a finely crystalline powder of the compound of the formula

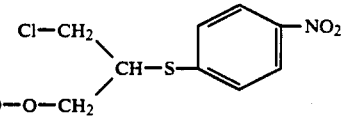

having a melting point of 110° C. are obtained.
Elemental analysis:
calculated: C 45.6%, H 4.17%, N 4.8%, Cl 12.2%;
found: C 45.6%, H 4.2%, N 4.8%, Cl 12.4%.
$^1$H-NMR analysis: 2.05 ppm (3H;s), 3.97 ppm (2H;d), 4.18 ppm (1H;quintet), 4.35 ppm (2H;m),
7.67 ppm (2H;d), 8.18 ppm (2H;d).

EXAMPLE E

To prepare 1-chloro-3-acetyloxy-isopropyl 4-nitrophenyl sulfone, 120 parts by volume of 35% strength aqueous hydrogen peroxide are slowly added to a solution, heated at 70° C., of 145 parts of 1-chloro-3-acetyloxy-isopropyl-(4'-nitro-phenyl) sulfide (Example D) in 450 parts by volume of glacial acetic acid, after addition of 2 parts of sodium tungstate, in the course of about 30 minutes. The mixture is subsequently stirred for about a further 15 minutes and cooled to about 20° C., 100 parts of water are added, the solution is cooled to 0° C. and the white precipitate is isolated. 145 parts of a finely crystalline powder of the compound of the formula

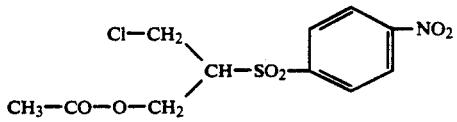

having a melting point of 89° C. are obtained.
Elemental analysis:
calculated: C 41.1%, H 3.7%, N 4.3%, Cl 11.0%;
found: C 41.4%, H 3.6%, N 4.1%, Cl 11.1%.

EXAMPLE F

To prepare 1-chloro-3-cyano-isopropyl-(4'-nitro-phenyl) sulfide, 4.0 parts of allyl cyanide are slowly added to a solution of 7.6 parts of 4-nitrophenyl-sulfenyl chloride at −20° C. The mixture is subsequently stirred for a further hour and volatile constituents are then removed under reduced pressure. After some time, the brown residue which remains solidifies. After recrystallization from a mixture of equal parts of diethyl ether and methylene chloride, 6.7 parts of the compound of the formula

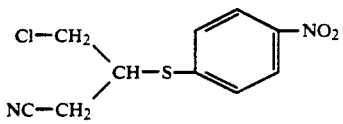

are obtained in the form of yellowish crystals having a melting point of 68° C.
Elemental analysis:
calculated: C 46.7%, H 3.5%, N 10.9%, Cl 13.8%;
found: C 45.9%, H 3.5%, N 10.9%, Cl 14.6%.
$^1$H-NMR analysis: 3.1 ppm (2H;m), 3.9 ppm (2H;m), 4.27 ppm (1H;m), 7.75 ppm (2H;d),
8.2 ppm (2H;d).

EXAMPLE G

To prepare 1-chloro-3-cyano-isopropyl 4-nitro-phenyl sulfone, 7 parts by volume of a 35% strength aqueous hydrogen peroxide solution are slowly added to a solution, heated at 60° C., of 3.84 parts of 1-chloro-3-cyano-isopropyl-(4'-nitro-phenyl) sulfide (Example F) in 30 parts by volume of glacial acetic acid, after addition of 0.005 part of sodium tungstate, in the course of 30 minutes. The mixture is subsequently stirred for a further brief period of time and cooled to −15° C., and the product which has precipitated is isolated after some time.

2.6 parts of the compound of the formula

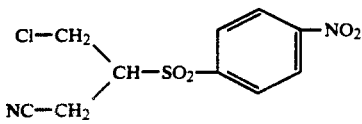

are obtained in the form of a white powder having a melting point of 101° C.
Elemental analysis:
calculated: C 41.6%, H 3.1%, N 9.7%, Cl 12.2%;
found: C 41.4%, H 3.0%, N 9.7%, Cl 12.4%.
$^1$H-NMR analysis: 3.2 ppm (2H;m), 4.0 ppm (2H;m), 4.5 ppm (1H;quintet), 8.25 ppm (2H;d),
8.5 ppm (2H;d).

EXAMPLE H

To prepare 1,3-dichloro-isopropyl-(3'-nitro-phenyl) sulfide, chlorine is passed into a solution of 55.45 parts of bis-(3-nitro-phenyl) disulfide in 300 parts by volume of methylene chloride at −10° C. and the mixture is subsequently stirred at this temperature for a further period of time. Dry nitrogen is then passed through the reaction solution for about 15 minutes and 37 parts by volume of allyl chloride are subsequently added slowly at −40° C. The mixture is subsequently stirred for a further short period of time and volatile constituents are then removed under reduced pressure. A brown oil which can be employed for the preparation of the corresponding sulfonyl compound without further purification (see Example J) is obtained.

A small amount of the resulting crude sulfide was purified by chromatography. It showed the following $^1$H-NMR analysis values: 4.1 ppm (4H;m), 4.5 ppm (1H;quintet), 7.98 ppm (1H;t), 8.38 ppm (1H;d), 8.61 ppm (1H;d), 8.6 ppm ($^1$H;d).

EXAMPLE J

To prepare 1,3-dichloro-isopropyl 3-nitro-phenyl sulfone, 80 parts by volume of a 35% strength aqueous hydrogen peroxide solution are slowly added to a solution, heated at 70° C., of the sulfide compound of Example H, after addition of 0.02 part of sodium tungstate. The mixture is subsequently stirred at 70° C. for about a further 90 minutes and a further 20 parts by volume of the hydrogen peroxide solution are then added. After further subsequent stirring for a short time, 100 parts of water are added to the mixture, the mixture is cooled to 0° C. and after some time the finely crystalline precipitate is isolated.

79.5 parts of the compound of the formula

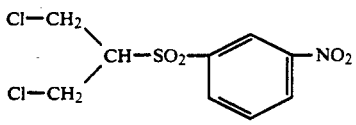

having a melting point of 110° C. are obtained.
Elemental analysis:
calculated: C 36.2%, H 3.04%, N 4.7%, Cl 23.8%,
S 10.7%, 0 21.4%;
found: C 36.6%, H 3.1%, N 4.7%, Cl 23.5%,
S 10.6%, 0 21.9%.
$^1$H-NMR analysis: 4.05 ppm (4H;m), 4.5 ppm (1H;t), 7.98 ppm ($^1$H;m), 8.38 ppm (1H;m),
8.61 ppm (1H;m).

EXAMPLE K

To prepare 1-chloro-3-acetyloxy-isopropyl 4-aminophenyl sulfone, a solution of 6 parts of 1-chloro-3-acetyloxy-isopropyl 4-nitro-phenyl sulfone (Example C) in 47 parts by volume of dioxane and a mixture of 47 parts by volume of concentrated aqueous hydrochloric acid, 20 parts of water and 14 parts by volume of dioxane are simultaneously added slowly to a mixture of 47 parts of water, 20 parts by volume of dioxane and 15 parts of zinc powder at 15° to 20° C., while stirring thoroughly. The mixture is subsequently stirred at 15° to 20° C. for about a further 15 minutes, the precipitate is filtered off, the filtrate is brought to a pH of 4 with sodium acetate and after some time the product which has precipitated is isolated.

5 parts of the compound of the formula

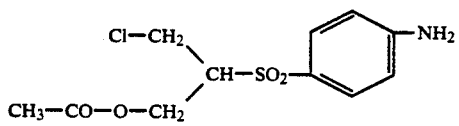

are obtained as a fine white crystalline powder having a melting point of 124° C.

¹H-NMR analysis: 1.90 ppm (3H;s), 3.82 ppm (2H;m), 3.98 ppm (1H;m), 4.38 ppm (2H;m),
6.2 ppm (2H;broad), 6.65 ppm (2H;d),
7.45 ppm (2H;d).

EXAMPLE L

To prepare 1-bromo-3-chloro-isopropyl-(4'-nitrophenyl) sulfide, chlorine is passed into a solution of 31 parts of bis-(4-nitro-phenyl) disulfide in 150 parts by volume of methylene chloride at −10° C. The mixture is subsequently stirred for a further period of time, dry nitrogen is then passed through for about 15 minutes and 40 parts of allyl bromide are then slowly added at −40° C. The mixture is subsequently stirred for a further hour, the solution is heated to about 20° C. and volatile constituents are removed under reduced pressure. 51 parts of a brown crystalline crude product which can be employed for the synthesis of the corresponding sulfonyl compound without further purification (see Example M) are obtained.

A small amount of this crude product was recrystallized from a mixture of equal parts of diethyl ether and methylene chloride. It has a melting point of 60° C.; the following analytical values were obtained:

Elemental analysis:
calculated: C 34.8%, H 2.9%r N 4.5%;
found: C 34.9%, H 2.9%, N 4.6%.

¹H-NMR analysis: 3.9 ppm (2H;m), 4.02 ppm (2H;m), 4.27 ppm (1H;quintet), 7.77 ppm (2H;d),
8.19 ppm (2H;d).

EXAMPLE M

To prepare 1-bromo-3-chloro-isopropyl 4-nitro-phenyl sulfone, 86 parts by volume of a 35% strength aqueous hydrogen peroxide solution are slowly added to a solution, heated to 70° C., of 75 parts of 1-bromo-3-chloro-isopropyl-(4'-nitro-phenyl) sulfide in 100 parts by volume of glacial acetic acid, after addition of 0.5 part of sodium tungstate. The reaction mixture is subsequently stirred for a further short period of time and cooled to 0° C. and after about 2 hours the product which has precipitated is isolated. 66 parts of the compound of the formula

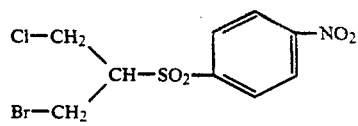

are obtained in the form of slightly yellowish crystals having a melting point of 108° C.

C,H,N analysis: calculated: C 31.5%, H 2.6%, N 4.1%;
found: C 30.7%, H 2.6%, N 3.9%.

¹H-NMR analysis: 3.7 ppm (2H;m), 3.93 ppm (2H;m), 4.12 ppm (1H;d), 8.15 ppm (2H;d),
8.43 ppm (2H;d).

EXAMPLE N

To prepare 1,3-dichloro-isopropyl 4-aminophenyl sulfone, 29.8 parts of 1,3-dichloro-isopropyl 4-nitrophenyl sulfone, dissolved in 300 parts by volume of glacial acetic acid, are hydrogenated under a hydrogen pressure of 10 bar with the addition of 1.5 parts of a palladium/active charcoal catalyst (10% of palladium on active charcoal). When the uptake of hydrogen has ended, the majority of the acetic acid is distilled off under reduced pressure. 10 times the amount of water are added to the residue and the product is filtered off with suction and dried. The compound of the formula shown in Example C is obtained as a white crystalline powder (24 parts).

EXAMPLE P

To prepare 1,3-dichloro-isopropyl 3-aminophenyl sulfone, 25 parts of 1,3-dichloro-isopropyl 3-nitrophenyl sulfone (Example J), suspended in 300 parts by volume of glacial acetic acid, are hydrogenated in accordance with the information in Example N. When the uptake of hydrogen has ended, the majority of glacial acetic acid is distilled off and the resulting residue is stirred into 10 times the amount of water. The reduced product initially precipitates in resinous form, but crystallizes after some time. About 20.8 parts of a white powder of the compound of the formula

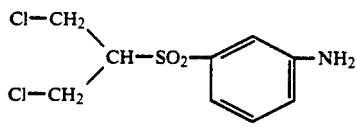

having a melting point of 69° C. are obtained.

C,H,N analysis:
calculated: C 40.3%, H 4.1%, N 5.2%, Cl 26.4%;
found: C 40.5%, H 4.1%, N 5.2%, Cl 26.3%.

¹H-NMR analysis: 4.0 ppm (4H;m), 4.07 ppm (1H;M), 5.65 ppm (2H;broad), 6.91 ppm (1H;d),
7.00 ppm (1H;d), 7.09 ppm (1H;t),
7.29 ppm (1H;t).

EXAMPLE 1

A suspension of 26.3 parts of 1-amino-8-naphthol-3,6-disulfonic acid in a mixture of 70 parts by volume of water and 11 parts by volume of an aqueous 37% strength sodium hydroxide solution is added to a suspension of 19.4 parts of cyanuric chloride in 160 parts of ice/water. The reaction is carried out at a pH of between 2 and 2.5, which is maintained by means of a 15% strength aqueous sodium carbonate solution, for one hour. 17.4 parts of aniline-3-sulfonic acid are then added and the second condensation reaction is carried out at 20 to 25° C. at a pH of 6.5.

In a separate step to the preparation of the coupling component, 26.6 parts of 4-(1,3-dichloro-isopropyl-sulfonyl)-aniline are suspended in 40 parts by volume of a concentrated aqueous hydrochloric acid, a portion of the suspension is initially added slowly to an ice-cold solution of 1.3 parts of sodium nitrite in 200 parts of water, while stirring, and the remainder of the suspension and an ice-cold solution of 7.3 parts of sodium nitrite in 70 parts of water are then added simultaneously to this initial mixture, likewise slowly and while stirring. When the diazotization reaction has ended, excess nitrite is destroyed with amidosulfonic acid in the customary manner, the mixture is clarified by means of kieselguhr and the filtered diazonium salt solution is added to the solution of the coupling component. The coupling reaction is carried out at a pH of 6 and a temperature of 20° C.

The azo compound according to the invention is salted out with sodium chloride, filtered off with suction and dried. It has the formula

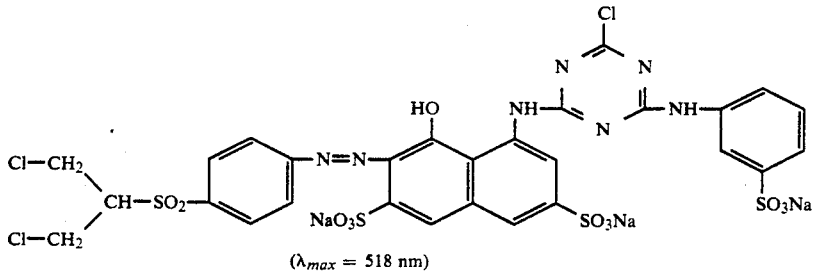

($\lambda_{max}$ = 518 nm)

shows very good fiber-reactive dyestuff properties and, when used in the application and fixing processes known for fiber-reactive dyestuffs on the materials mentioned in the description, such as, in particular, cellulose fiber materials, for example cotton, gives deep bluish-tinged red dyeings and prints with good fastness properties, of which the light fastnesses and light fastnesses when wet, such as light fastnesses under the influence of perspiration, can be singled out in particular.

EXAMPLE 2

To prepare the coupling component, 18.4 parts of cyanuric chloride are suspended in 400 parts of ice-water, 4.3 parts of cyanamide are added and a pH of between 8 and 8.5 is established by gradual addition of sodium hydroxide solution. When the reaction has ended, the pH is brought to 2 to 2.5, 29.5 parts of 1-amino-8-naphthol-3,6-disulfonic acid are then added, the mixture is heated to 35° C. and the pH range of 2 to 2.5 is maintained by corresponding addition of an aqueous sodium carbonate solution. When this second condensation reaction has ended, the mixture is heated to 80° C., 17.4 parts of aniline-3-sulfonic acid are added and the third condensation reaction is carried out at a pH of 5.

After synthesis of the coupling component, the solution is brought to a pH of 7 and the procedure for preparation of the azo compound according to the invention is then in accordance with the procedure of Example 1, by reaction with the diazonium salt of 4-(1,3-dichloro-isopropyl-sulfonyl)-aniline. After salting out with sodium chloride, filtering off with suction and drying, the azo compound according to the invention, of the formula

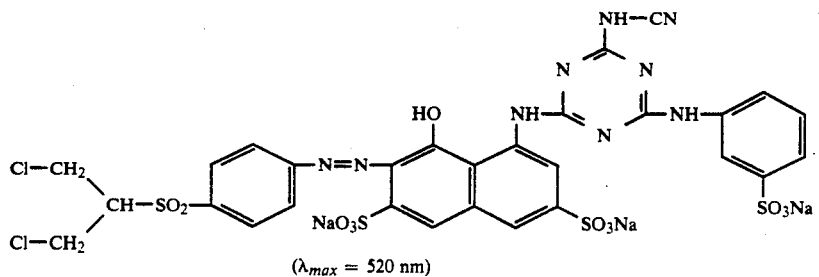

($\lambda_{max}$ = 520 nm)

is obtained in the form of a dark red powder containing electrolyte. The azo compound according to the invention has very good fiber-reactive dyestuff properties and gives, for example on cellulose fiber materials in the dyeing and printing processes for fiber-reactive dyestuffs, deep bluish-tinged red dyeings and prints having good fastness properties, of which the light fastnesses and light fastnesses when wet, such as light fastnesses under the influence of perspiration, can be singled out in particular.

EXAMPLE 3

To prepare a coupling component, a suspension of 26.3 parts of 1-amino-8-naphthol-3,6-disulfonic acid in 180 parts of water is reacted with 13.7 parts of trifluoro-triazine, which is slowly added to the amino-naphthol compound, at 0° C. and a pH of between 3 and 4. A solution, cooled to about 5° C., of 17.4 parts of aniline-3-sulfonic acid in 200 parts of water is then added and the second condensation reaction is carried out at a pH of between 5 and 7 and a temperature of about 5° C.

After preparation of this coupling component, the coupling reaction with the diazonium salt of Example 1 is carried out by the procedure described in that example. The azo compound according to the invention is isolated by salting out. It has the formula

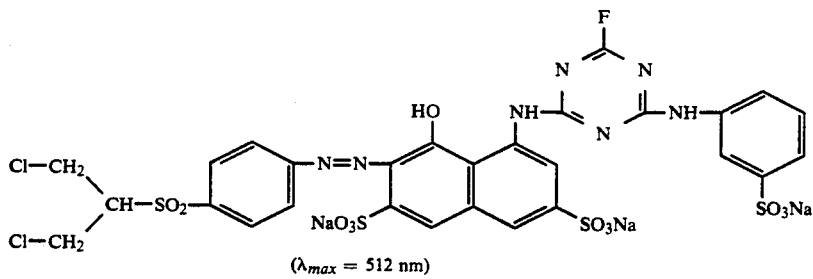

($\lambda_{max}$ = 512 nm)

shows very good fiber-reactive dyestuff properties and gives, for example on cellulose fiber materials, such as cotton, after the application and fixing processes customary for fiber-reactive dyestuffs, bluish-tinged red dyeings and prints having good fastness properties, of which the light fastnesses and light fastnesses when wet, such as light fastnesses under the influence of perspiration, can be singled out in particular.

EXAMPLES 4 TO 123

Further azo compounds according to the invention are described in the following Tabular Examples with the aid of the formula (A)

They can be prepared in the manner according to the invention, for example analogously to one of the above Embodiment Examples, from the starting compounds which can be seen from the formula in association with the data of the particular Tabular Example (a dichloroisopropyl-sulfonyl-aniline, an aminonaphtholdisulfonic acid, a halogeno-s-triazine, an amine corresponding to the formula H-R* and if appropriate cyanamide). They show very good fiber-reactive dyestuff properties and give, for example on cotton after the application and fixing processes customary in the art, deep, fast dyeings and prints having the color shade shown for the particular Tabular Example.

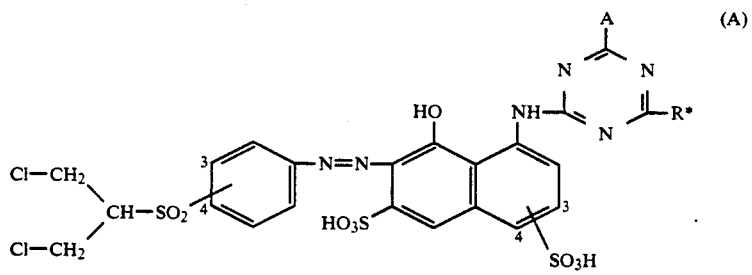

(A)

| Example | Sulfonyl radical in the ...-position | —SO$_3$H group in the ...-position | Radical A | Radical R* | Color shade |
|---|---|---|---|---|---|
| | | Azo compound of the formula (A) | | | |
| 4 | 4- | 3- | Chlorine | 4-Sulfo-phenylamino | Red (516) |
| 5 | 3- | 3- | Chlorine | 4-Sulfo-phenylamino | Red (508) |
| 6 | 4- | 4- | Chlorine | 3-Sulfo-phenylamino | Red (507) |
| 7 | 3- | 4- | Chlorine | 3-Sulfo-phenylamino | Red (504) |
| 8 | 4- | 4- | Chlorine | 2-Sulfo-phenylamino | Red (507) |
| 9 | 3- | 4- | Chlorine | 2-Sulfo-phenylamino | Red (503) |
| 10 | 4- | 3- | Chlorine | 2,5-Diulfo-phenylamino | Red (516) |
| 11 | 3- | 3- | Chlorine | 2,5-Disulfo-phenylamino | Red (505) |
| 12 | 4- | 3- | Chlorine | 4-Carboxy-phenylamino | Red (518) |
| 13 | 3- | 3- | Chlorine | 4-Carboxy-phenylamino | Red (510) |
| 14 | 4- | 4- | Chlorine | N-Methyl-N-($\beta$-sulfo-ethyl)amino | Red (513) |
| 15 | 3- | 4- | Chlorine | N-Methyl-N-($\beta$-sulfo-ethyl)amino | Red (504) |
| 16 | 4- | 4- | Chlorine | (Carboxy-methyl)-amino | Red (513) |
| 17 | 4- | 4- | Chlorine | (Carboxy-methyl)-amino | Red (504) |
| 18 | 4- | 3- | Chlorine | 4-($\beta$-Sulfato- | Red |

-continued

| | Azo compound of the formula (A) | | | | |
|---|---|---|---|---|---|
| Example | Sulfonyl radical in the ...-position | —SO₃H group in the ...-position | Radical A | Radical R* | Color shade |
| | | | | ethylsulfonyl)-phenylamino | (516) |
| 19 | 3- | 3- | Chlorine | 4-(β-Sulfato-ethylsulfonyl)-phenylamino | Red (514) |
| 20 | 4- | 3- | Chlorine | 3-(β-Sulfato-ethylsulfonyl)-phenylamino | Red (518) |
| 21 | 3- | 3- | Chlorine | 3-(β-Sulfato-ethylsulfonyl)-phenylamino | Red (514) |
| 22 | 4- | 3- | Chlorine | γ-(β'-Sulfatoethyl-sulfonyl)-propylamino | Red (518) |
| 23 | 4- | 3- | Chlorine | γ-(β'-Sulfatoethyl-sulfonyl)-propylamino | Red (515) |
| 24 | 4- | 4- | Chlorine | 4-Sulfo-phenylamino | Red (507) |
| 25 | 3- | 4- | Chlorine | 4-Sulfo-phenylamino | Red (504) |
| 26 | 4- | 3- | Chlorine | 3-Sulfo-phenylamino | Red (516) |
| 27 | 3- | 3- | Chlorine | 3-Sulfo-phenylamino | Red (507) |
| 28 | 4- | 4- | Chlorine | 2-Sulfo-phenylamino | Red (516) |
| 29 | 3- | 3- | Chlorine | 2-Sulfo-phenylamino | Red (506) |
| 30 | 4- | 4- | Chlorine | 2,5-Diulfo-phenylamino | Red (506) |
| 31 | 3- | 4- | Chlorine | 2,5-Disulfo-phenylamino | Red (503) |
| 32 | 4- | 4- | Chlorine | 4-Carboxy-phenylamino | Red (508) |
| 33 | 3- | 4- | Chlorine | 4-Carboxy-phenylamino | Red (505) |
| 34 | 4- | 3- | Chlorine | N-Methyl-N-(β-sulfo-ethyl)amino | Red (518) |
| 35 | 3- | 3- | Chlorine | N-Methyl-N-(β-sulfo-ethyl)amino | Red (514) |
| 36 | 4- | 3- | Chlorine | (Carboxy-methyl)-amino | Red (518) |
| 37 | 4- | 3- | Chlorine | (Carboxy-methyl)-amino | Red (514) |
| 38 | 4- | 4- | Chlorine | 4-(β-Sulfato-ethylsulfonyl)-phenylamino | Red (507) |
| 39 | 3- | 4- | Chlorine | 4-(β-Sulfato-ethylsulfonyl)-phenylamino | Red (503) |
| 40 | 4- | 4- | Chlorine | 3-(β-Sulfato-ethylsulfonyl)-phenylamino | Red (507) |
| 41 | 3- | 4- | Chlorine | 3-(β-Sulfato-ethylsulfonyl)-phenylamino | Red (504) |
| 42 | 4- | 4- | Chlorine | γ-(β'-Sulfatoethyl-sulfonyl)-propylamino | Red (508) |
| 43 | 4- | 4- | Chlorine | γ-(β'-Sulfatoethyl-sulfonyl)-propylamino | Red (505) |
| 44 | 4- | 4- | Cyanoamido | 4-Sulfo-phenylamino | Red (511) |
| 45 | 3- | 4- | Cyanoamido | 4-Sulfo-phenylamino | Red (508) |
| 46 | 4- | 3- | Cyanoamido | 3-Sulfo-phenylamino | Red (520) |
| 47 | 3- | 3- | Cyanoamido | 3-Sulfo-phenylamino | Red (511) |
| 48 | 4- | 3- | Cyanoamido | 2-Sulfo-phenylamino | Red (520) |

-continued

| | Sulfonyl radical | Azo compound of the formula (A) | | | |
|---|---|---|---|---|---|
| Example | in the ... -position | —SO₃H group in the ... -position | Radical A | Radical R* | Color shade |
| 49 | 3- | 3- | Cyanoamido | 2-Sulfo-phenylamino | Red (510) |
| 50 | 4- | 4- | Cyanoamido | 2,5-Diulfo-phenylamino | Red (510) |
| 51 | 3- | 4- | Cyanoamido | 2,5-Disulfo-phenylamino | Red (507) |
| 52 | 4- | 4- | Cyanoamido | 4-Carboxy-phenylamino | Red (512) |
| 53 | 3- | 4- | Cyanoamido | 4-Carboxy-phenylamino | Red (509) |
| 54 | 4- | 3- | Cyanoamido | N-Methyl-N-(β-sulfo-ethyl)amino | Red (522) |
| 55 | 3- | 3- | Cyanoamido | N-Methyl-N-(β-sulfo-ethyl)amino | Red (518) |
| 56 | 4- | 3- | Cyanoamido | (Carboxy-methyl)-amino | Red (511) |
| 57 | 4- | 3- | Cyanoamido | (Carboxy-methyl)-amino | Red (507) |
| 58 | 4- | 4- | Cyanoamido | 4-(β-Sulfato-ethylsulfonyl)-phenylamino | Red (511) |
| 59 | 3- | 4- | Cyanoamido | 4-(β-Sulfato-ethylsulfonyl)-phenylamino | Red (508) |
| 60 | 4- | 4- | Cyanoamido | 3-(β-Sulfato-ethylsulfonyl)-phenylamino | Red (512) |
| 61 | 3- | 4- | Cyanoamido | 3-(β-Sulfato-ethylsulfonyl)-phenylamino | Red (507) |
| 62 | 4- | 4- | Cyanoamido | γ-(β'-Sulfatoethyl-sulfonyl)-propylamino | Red (511) |
| 63 | 4- | 4- | Cyanoamido | γ-(β'-Sulfatoethyl-sulfonyl)-propylamino | Red (508) |
| 64 | 4- | 3- | Cyanoamido | 4-Sulfo-phenylamino | Red (520) |
| 65 | 3- | 3- | Cyanoamido | 4-Sulfo-phenylamino | Red (512) |
| 66 | 4- | 4- | Cyanoamido | 3-Sulfo-phenylamino | Red (511) |
| 67 | 3- | 4- | Cyanoamido | 3-Sulfo-phenylamino | Red (508) |
| 68 | 4- | 4- | Cyanoamido | 2-Sulfo-phenylamino | Red (513) |
| 69 | 3- | 4- | Cyanoamido | 2-Sulfo-phenylamino | Red (507) |
| 70 | 4- | 3- | Cyanoamido | 2,5-Diulfo-phenylamino | Red (520) |
| 71 | 3- | 3- | Cyanoamido | 2,5-Disulfo-phenylamino | Red (510) |
| 72 | 4- | 3- | Cyanoamido | 4-Carboxy-phenylamino | Red (522) |
| 73 | 3- | 3- | Cyanoamido | 4-Carboxy-phenylamino | Red (514) |
| 74 | 4- | 4- | Cyanoamido | N-Methyl-N-(β-sulfo-ethyl)amino | Red (517) |
| 75 | 3- | 4- | Cyanoamido | N-Methyl-N-(β-sulfo-ethyl)amino | Red (508) |
| 76 | 4- | 4- | Cyanoamido | (Carboxy-methyl)-amino | Red (517) |
| 77 | 4- | 4- | Cyanoamido | (Carboxy-methyl)-amino | Red (508) |
| 78 | 4- | 3- | Cyanoamido | 4-(β-Sulfato-ethylsulfonyl)-phenylamino | Red (520) |
| 79 | 3- | 3- | Cyanoamido | 4-(β-Sulfato-ethylsulfonyl)-phenylamino | Red (518) |
| 80 | 4- | 3- | Cyanoamido | 3-(β-Sulfato-ethylsulfonyl)-phenylamino | Red (522) |

-continued

| | | Azo compound of the formula (A) | | | |
|---|---|---|---|---|---|
| Example | Sulfonyl radical in the ...-position | —SO₃H group in the ...-position | Radical A | Radical R* | Color shade |
| 81 | 3- | 3- | Cyanoamido | 3-(β-Sulfato-ethylsulfonyl)-phenylamino | Red (518) |
| 82 | 4- | 3- | Cyanoamido | γ-(β'-Sulfatoethyl-sulfonyl)-propylamino | Red (521) |
| 83 | 4- | 3- | Cyanoamido | γ-(β'-Sulfatoethyl-sulfonyl)-propylamino | Red (519) |
| 84 | 4- | 4- | Fluorine | 4-Sulfo-phenylamino | Red (504) |
| 85 | 3- | 4- | Fluorine | 4-Sulfo-phenylamino | Red (501) |
| 86 | 4- | 3- | Fluorine | 3-Sulfo-phenylamino | Red (512) |
| 87 | 3- | 3- | Fluorine | 3-Sulfo-phenylamino | Red (507) |
| 88 | 4- | 3- | Fluorine | 2-Sulfo-phenylamino | Red (513) |
| 89 | 3- | 3- | Fluorine | 2-Sulfo-phenylamino | Red (508) |
| 90 | 4- | 4- | Fluorine | 2,5-Diulfo-phenylamino | Red (503) |
| 91 | 3- | 4- | Fluorine | 2,5-Disulfo-phenylamino | Red (500) |
| 92 | 4- | 4- | Fluorine | 4-Carboxy-phenylamino | Red (505) |
| 93 | 3- | 4- | Fluorine | 4-Carboxy-phenylamino | Red (502) |
| 94 | 4- | 3- | Fluorine | N-Methyl-N-(β-sulfo-ethyl)amino | Red (515) |
| 95 | 3- | 3- | Fluorine | N-Methyl-N-(β-sulfo-ethyl)amino | Red (511) |
| 96 | 4- | 3- | Fluorine | (Carboxy-methyl)-amino | Red (515) |
| 97 | 4- | 3- | Fluorine | (Carboxy-methyl)-amino | Red (512) |
| 98 | 4- | 4- | Fluorine | 4-(β-Sulfato-ethylsulfonyl)-phenylamino | Red (505) |
| 99 | 3- | 4- | Fluorine | 4-(β-Sulfato-ethylsulfonyl)-phenylamino | Red (499) |
| 100 | 4- | 4- | Fluorine | 3-(β-Sulfato-ethylsulfonyl)-phenylamino | Red (506) |
| 101 | 3- | 4- | Fluorine | 3-(β-Sulfato-ethylsulfonyl)-phenylamino | Red (500) |
| 102 | 4- | 4- | Fluorine | γ-(β'-Sulfatoethyl-sulfonyl)-propylamino | Red (508) |
| 103 | 4- | 4- | Fluorine | γ-(β'-Sulfatoethyl-sulfonyl)-propylamino | Red (504) |
| 104 | 4- | 3- | Fluorine | 4-Sulfo-phenylamino | Red (516) |
| 105 | 3- | 3- | Fluorine | 4-Sulfo-phenylamino | Red (505) |
| 106 | 4- | 4- | Fluorine | 3-Sulfo-phenylamino | Red (504) |
| 107 | 3- | 4- | Fluorine | 3-Sulfo-phenylamino | Red (500) |
| 108 | 4- | 4- | Fluorine | 2-Sulfo-phenylamino | Red (504) |
| 109 | 3- | 4- | Fluorine | 2-Sulfo-phenylamino | Red (501) |
| 110 | 4- | 3- | Fluorine | 2,5-Diulfo-phenylamino | Red (514) |
| 111 | 3- | 3- | Fluorine | 2,5-Disulfo-phenylamino | Red (502) |
| 112 | 4- | 3- | Fluorine | 4-Carboxy-phenylamino | Red (515) |

-continued

| Example | Sulfonyl radical in the ...-position | —SO$_3$H group in the ...-position | Radical A | Radical R* | Color shade |
|---|---|---|---|---|---|
| 113 | 3- | 3- | Fluorine | 4-Carboxy-phenylamino | Red (510) |
| 114 | 4- | 4- | Fluorine | N-Methyl-N-($\beta$-sulfo-ethyl)amino | Red (510) |
| 115 | 3- | 4- | Fluorine | N-Methyl-N-($\beta$-sulfo-ethyl)amino | Red (501) |
| 116 | 4- | 4- | Fluorine | (Carboxy-methyl)-amino | Red (510) |
| 117 | 4- | 4- | Fluorine | (Carboxy-methyl)-amino | Red (502) |
| 118 | 4- | 3- | Fluorine | 4-($\beta$-Sulfato-ethylsulfonyl)-phenylamino | Red (514) |
| 119 | 3- | 3- | Fluorine | 4-($\beta$-Sulfato-ethylsulfonyl)-phenylamino | Red (511) |
| 120 | 4- | 3- | Fluorine | 3-($\beta$-Sulfato-ethylsulfonyl)-phenylamino | Red (515) |
| 121 | 3- | 3- | Fluorine | 3-($\beta$-Sulfato-ethylsulfonyl)-phenylamino | Red (512) |
| 122 | 4- | 3- | Fluorine | $\gamma$-($\beta'$-Sulfatoethyl-sulfonyl)-propylamino | Red (516) |
| 123 | 4- | 3- | Fluorine | $\gamma$-($\beta'$-Sulfatoethyl-sulfonyl)-propylamino | Red (513) |

EXAMPLE 124

14 parts of trifluorotriazine are slowly added to a neutral solution of 26.2 parts of the sodium salt of 2-amino-8-naphthol-6-sulfonic acid in about 320 parts of water at 0° C., the pH being kept at 6 to 6.5 by means of 10% strength aqueous sodium hydroxide solution. A short time after the addition has ended, the reaction mixture is heated to 20° C., 17.4 parts of aniline-3-sulfonic acid are then added and the second condensation reaction is carried out at a pH of between 6 and 6.5 at 20° to 25° C. When this reaction has ended, the mixture is cooled to 0° C., the solution, prepared according to Example 1, of the diazonium product of 26.6 parts of 4-(1,3-dichloro-isopropyl-sulfonyl)-aniline is added and the coupling reaction is brought to completion at a pH of between 4 and 4.5.

The azo compound according to the invention is salted out and isolated in the form of a red dyestuff powder containing electrolyte. It has the following chemical structure:

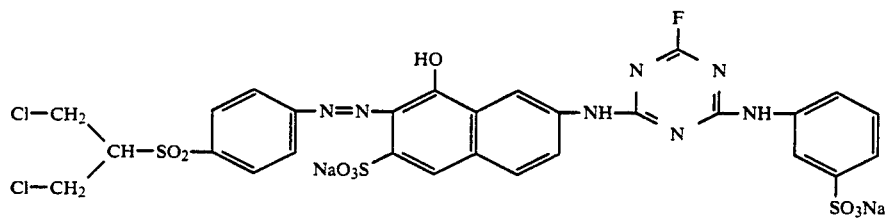

The azo compound according to the invention has very good fiber-reactive dyestuff properties and gives, on the materials mentioned in the description, such as, in particular, cellulose fiber materials, for example cotton, after the application and fixing processes customary for fiber-reactive dyestuffs, reddish-tinged orange dyeings and prints having good fastness properties, of which the light fastnesses and light fastnesses when wet, such as light fastnesses under the influence of perspiration, can be singled out in particular.

EXAMPLES 125 TO 226

Further azo compounds according to the invention are described in the following Tabular Examples with the aid of the formula (B)

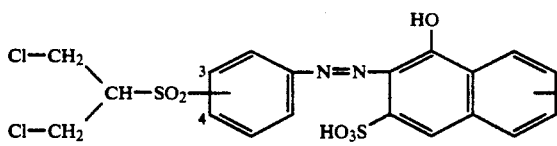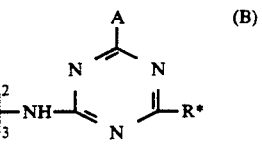

(B)

They can be prepared in the manner according to the invention, for example analogously to one of the above Embodiment Examples, from the starting compounds which can be seen from the formula in association with the data of the particular Tabular Example (a dichloroisopropyl-sulfonyl-aniline, an aminonaphtholdisulfonic acid, a halogeno-s-triazine, an amine corresponding to the formula H—R* and if appropriate cyanamide). They show very good fiber-reactive dyestuff properties and give, for example on cotton after the application and fixing processes customary in the art, deep, fast dyeings and prints having the color shade shown for the particular Tabular Example.

| | | Azo compound of the formula (B) | | | |
|---|---|---|---|---|---|
| Example | Sulfonyl radical in the ...-position | Triazinylamino group in the ...-position | Radical A | Radical R* | Color shade |
| 125 | 4- | 2- | Cyanoamido | 4-Sulfo-phenylamino | Orange-red (502) |
| 126 | 3- | 2- | Cyanoamido | 4-Sulfo-phenylamino | Orange-red (497) |
| 127 | 4- | 2- | Cyanoamido | 3-Sulfo-phenylamino | Orange-red (505) |
| 128 | 3- | 2- | Cyanoamido | 3-Sulfo-phenylamino | Orange-red (501) |
| 129 | 4- | 2- | Cyanoamido | 2-Sulfo-phenylamino | Orange-red (506) |
| 130 | 3- | 2- | Cyanoamido | 2-Sulfo-phenylamino | Orange-red (502) |
| 131 | 4- | 2- | Cyanoamido | 2,5-Diulfo-phenylamino | Orange-red (502) |
| 132 | 3- | 2- | Cyanoamido | 2,5-Disulfo-phenylamino | Orange-red (499) |
| 133 | 4- | 2- | Cyanoamido | 4-Carboxy-phenylamino | Orange-red (503) |
| 134 | 3- | 2- | Cyanoamido | 4-Carboxy-phenylamino | Orange-red (498) |
| 135 | 4- | 2- | Cyanoamido | N-Methyl-N-($\beta$-sulfo-ethyl)amino | Orange-red (503) |
| 136 | 3- | 2- | Cyanoamido | N-Methyl-N-($\beta$-sulfo-ethyl)amino | Orange-red (499) |
| 137 | 4- | 2- | Cyanoamido | (Carboxy-methyl)-amino | Orange-red (506) |
| 138 | 4- | 2- | Cyanoamido | (Carboxy-methyl)-amino | Orange-red (502) |
| 139 | 4- | 2- | Cyanoamido | 4-($\beta$-Sulfato-ethylsulfonyl)-phenylamino | Orange-red (503) |
| 140 | 3- | 2- | Cyanoamido | 4-($\beta$-Sulfato-ethylsulfonyl)-phenylamino | Orange-red (498) |
| 141 | 4- | 2- | Cyanoamido | 3-($\beta$-Sulfato-ethylsulfonyl)-phenylamino | Orange-red (502) |
| 142 | 3- | 2- | Cyanoamido | 3-($\beta$-Sulfato-ethylsulfonyl)-phenylamino | Orange-red (498) |
| 143 | 4- | 2- | Cyanoamido | $\gamma$-($\beta'$-Sulfatoethyl-sulfonyl)-propylamino | Orange-red (503) |
| 144 | 4- | 3- | Cyanoamido | $\gamma$-($\beta'$-Sulfatoethyl-sulfonyl)-propylamino | Orange-red (500) |
| 145 | 4- | 3- | Cyanoamido | 4-Sulfo-phenylamino | Orange-red (483) |
| 146 | 3- | 3- | Cyanoamido | 4-Sulfo-phenylamino | Orange-red (480) |
| 147 | 4- | 3- | Cyanoamido | 3-Sulfo-phenylamino | Orange-red (485) |
| 148 | 3- | 3- | Cyanoamido | 3-Sulfo-phenylamino | Orange-red (481) |
| 149 | 4- | 3- | Cyanoamido | 2-Sulfo- | Orange-red |

-continued

| | Azo compound of the formula (B) | | | | |
|---|---|---|---|---|---|
| Example | Sulfonyl radical in the ...-position | Triazinylamino group in the ...-position | Radical A | Radical R* | Color shade |
| 150 | 3- | 3- | Cyanoamido | phenylamino 2-Sulfo- | (486) Orange-red |
| 151 | 4- | 3- | Cyanoamido | phenylamino 2,5-Diulfo- | (481) Orange-red |
| 152 | 3- | 3- | Cyanoamido | phenylamino 2,5-Disulfo- | (484) Orange-red |
| 153 | 4- | 3- | Cyanoamido | phenylamino 4-Carboxy- | (479) Orange-red |
| 154 | 3- | 3- | Cyanoamido | phenylamino 4-Carboxy- | (484) Orange-red |
| 155 | 4- | 3- | Cyanoamido | phenylamino N-Methyl-N-(β-sulfo-ethyl)amino | (479) Orange-red (483) |
| 156 | 3- | 3- | Cyanoamido | N-Methyl-N-(β-sulfo-ethyl)amino | Orange-red (480) |
| 157 | 4- | 3- | Cyanoamido | (Carboxy-methyl)-amino | Orange-red (483) |
| 158 | 4- | 3- | Cyanoamido | (Carboxy-methyl)-amino | Orange-red (478) |
| 159 | 4- | 3- | Cyanoamido | 4-(β-Sulfato-ethylsulfonyl)-phenylamino | Orange-red (484) |
| 160 | 3- | 3- | Cyanoamido | 4-(β-Sulfato-ethylsulfonyl)-phenylamino | Orange-red (480) |
| 161 | 4- | 3- | Cyanoamido | 3-(β-Sulfato-ethylsulfonyl)-phenylamino | Orange-red (482) |
| 162 | 3- | 3- | Cyanoamido | 3-(β-Sulfato-ethylsulfonyl)-phenylamino | Orange-red (479) |
| 163 | 4- | 3- | Cyanoamido | γ-(β'-Sulfatoethyl-sulfonyl)-propylamino | Orange-red (485) |
| 164 | 4- | 3- | Cyanoamido | γ-(β'-Sulfatoethyl-sulfonyl)-propylamino | Orange-red (480) |
| 165 | 4- | 3- | Chlorine | 4-Sulfo-phenylamino | Orange-red (478) |
| 166 | 3- | 3- | Chlorine | 4-Sulfo-phenylamino | Orange-red (475) |
| 167 | 4- | 3- | Chlorine | 3-Sulfo-phenylamino | Orange-red (480) |
| 168 | 3- | 3- | Chlorine | 3-Sulfo-phenylamino | Orange-red (476) |
| 169 | 4- | 3- | Chlorine | 2-Sulfo-phenylamino | Orange-red (481) |
| 170 | 3- | 3- | Chlorine | 2-Sulfo-phenylamino | Orange-red (476) |
| 171 | 4- | 3- | Chlorine | 2,5-Diulfo-phenylamino | Orange-red (479) |
| 172 | 3- | 3- | Chlorine | 2,5-Disulfo-phenylamino | Orange-red (475) |
| 173 | 4- | 3- | Chlorine | 4-Carboxy-phenylamino | Orange-red (479) |
| 174 | 3- | 3- | Chlorine | 4-Carboxy-phenylamino | Orange-red (474) |
| 175 | 4- | 3- | Chlorine | N-Methyl-N-(β-sulfo-ethyl)amino | Orange-red (478) |
| 176 | 3- | 3- | Chlorine | N-Methyl-N-(β-sulfo-ethyl)amino | Orange-red (476) |
| 177 | 4- | 3- | Chlorine | (Carboxy-methyl)-amino | Orange-red (478) |
| 178 | 4- | 3- | Chlorine | (Carboxy-methyl)-amino | Orange-red (477) |
| 179 | 4- | 3- | Chlorine | 4-(β-Sulfato-ethylsulfonyl)-phenylamino | Orange-red (479) |
| 180 | 3- | 3- | Chlorine | 4-(β-Sulfato-ethylsulfonyl)-phenylamino | Orange-red (478) |
| 181 | 4- | 3- | Chlorine | 3-(β-Sulfato- | Orange-red |

-continued

| | | Azo compound of the formula (B) | | | |
|---|---|---|---|---|---|
| Example | Sulfonyl radical in the ...-position | Triazinylamino group in the ...-position | Radical A | Radical R* | Color shade |
| | | | | ethylsulfonyl)-phenylamino | (478) |
| 182 | 3- | 3- | Chlorine | 3-(β-Sulfato-ethylsulfonyl)-phenylamino | Orange-red (476) |
| 183 | 4- | 3- | Chlorine | γ-(β'-Sulfatoethyl-sulfonyl)-propylamino | Orange-red (480) |
| 184 | 4- | 3- | Chlorine | γ-(β'-Sulfatoethyl-sulfonyl)-propylamino | Orange-red (476) |
| 185 | 4- | 2- | Chlorine | 4-Sulfo-phenylamino | Orange-red (497) |
| 186 | 3- | 2- | Chlorine | 4-Sulfo-phenylamino | Orange-red (492) |
| 187 | 4- | 2- | Chlorine | 3-Sulfo-phenylamino | Orange-red (500) |
| 188 | 3- | 2- | Chlorine | 3-Sulfo-phenylamino | Orange-red (496) |
| 189 | 4- | 2- | Chlorine | 2-Sulfo-phenylamino | Orange-red (501) |
| 190 | 3- | 2- | Chlorine | 2-Sulfo-phenylamino | Orange-red (498) |
| 191 | 4- | 2- | Chlorine | 2,5-Diulfo-phenylamino | Orange-red (499) |
| 192 | 3- | 2- | Chlorine | 2,5-Disulfo-phenylamino | Orange-red (494) |
| 193 | 4- | 2- | Chlorine | 4-Carboxy-phenylamino | Orange-red (497) |
| 194 | 3- | 2- | Chlorine | 4-Carboxy-phenylamino | Orange-red (494) |
| 195 | 4- | 2- | Chlorine | N-Methyl-N-(β-sulfo-ethyl)amino | Orange-red (498) |
| 196 | 3- | 2- | Chlorine | N-Methyl-N-(β-sulfo-ethyl)amino | Orange-red (493) |
| 197 | 4- | 2- | Chlorine | (Carboxy-methyl)-amino | Orange-red (501) |
| 198 | 4- | 2- | Chlorine | (Carboxy-methyl)-amino | Orange-red (496) |
| 199 | 4- | 2- | Chlorine | 4-(β-Sulfato-ethylsulfonyl)-phenylamino | Orange-red (497) |
| 200 | 3- | 2- | Chlorine | 4-(β-Sulfato-ethylsulfonyl)-phenylamino | Orange-red (493) |
| 201 | 4- | 2- | Chlorine | 3-(β-Sulfato-ethylsulfonyl)-phenylamino | Orange-red (497) |
| 202 | 3- | 2- | Chlorine | 3-(β-Sulfato-ethylsulfonyl)-phenylamino | Orange-red (493) |
| 203 | 4- | 2- | Chlorine | γ-(β'-Sulfatoethyl-sulfonyl)-propylamino | Orange-red (498) |
| 204 | 4- | 2- | Chlorine | γ-(β'-Sulfatoethyl-sulfonyl)-propylamino | Orange-red (494) |
| 205 | 4- | 3- | Fluorine | 4-Sulfo-phenylamino | Orange-red (473) |
| 206 | 3- | 3- | Fluorine | 4-Sulfo-phenylamino | Orange-red (470) |
| 207 | 4- | 3- | Fluorine | 3-Sulfo-phenylamino | Orange-red (475) |
| 208 | 3- | 3- | Fluorine | 3-Sulfo-phenylamino | Orange-red (471) |
| 209 | 4- | 3- | Fluorine | 2-Sulfo-phenylamino | Orange-red (476) |
| 210 | 3- | 3- | Fluorine | 2-Sulfo-phenylamino | Orange-red (471) |
| 211 | 4- | 3- | Fluorine | 2,5-Diulfo-phenylamino | Orange-red (474) |
| 212 | 3- | 3- | Fluorine | 2,5-Disulfo- | Orange-red |

-continued

| | | Azo compound of the formula (B) | | | |
|---|---|---|---|---|---|
| Example | Sulfonyl radical in the ... -position | Triazinylamino group in the ... -position | Radical A | Radical R* | Color shade |
| 213 | 4- | 3- | Fluorine | 4-Carboxy-phenylamino | Orange-red (471) |
| 214 | 3- | 3- | Fluorine | 4-Carboxy-phenylamino | Orange-red (474) |
| 215 | 4- | 3- | Fluorine | N-Methyl-N-(β-sulfo-ethyl)amino | Orange-red (470) |
| 216 | 3- | 3- | Fluorine | N-Methyl-N-(β-sulfo-ethyl)amino | Orange-red (473) |
| 217 | 4- | 3- | Fluorine | (Carboxy-methyl)-amino | Orange-red (470) |
| 218 | 4- | 3- | Fluorine | (Carboxy-methyl)-amino | Orange-red (474) |
| 219 | 4- | 3- | Fluorine | 4-(β-Sulfato-ethylsulfonyl)-phenylamino | Orange-red (469) |
| 220 | 3- | 3- | Fluorine | 4-(β-Sulfato-ethylsulfonyl)-phenylamino | Orange-red (472) |
| 221 | 4- | 3- | Fluorine | 3-(β-Sulfato-ethylsulfonyl)-phenylamino | Orange-red (470) |
| 222 | 3- | 3- | Fluorine | 3-(β-Sulfato-ethylsulfonyl)-phenylamino | Orange-red (473) |
| 223 | 4- | 3- | Fluorine | γ-(β'-Sulfatoethyl-sulfonyl)-propylamino | Orange-red (470) |
| 224 | 4- | 3- | Fluorine | γ-(β'-Sulfatoethyl-sulfonyl)-propylamino | Orange-red (475) |
| 225 | 4- | 2- | Fluorine | 4-Sulfo-phenylamino | Orange-red (470) |
| 226 | 3- | 2- | Fluorine | 4-Sulfo-phenylamino | Orange-red (492) |
| 227 | 4- | 2- | Fluorine | 3-Sulfo-phenylamino | Orange-red (487) |
| 228 | 3- | 2- | Fluorine | 3-Sulfo-phenylamino | Orange-red (495) |
| 229 | 4- | 2- | Fluorine | 2-Sulfo-phenylamino | Orange-red (491) |
| 230 | 3- | 2- | Fluorine | 2-Sulfo-phenylamino | Orange-red (496) |
| 231 | 4- | 2- | Fluorine | 2,5-Diulfo-phenylamino | Orange-red (494) |
| 232 | 3- | 2- | Fluorine | 2,5-Disulfo-phenylamino | Orange-red (494) |
| 233 | 4- | 2- | Fluorine | 4-Carboxy-phenylamino | Orange-red (489) |
| 234 | 3- | 2- | Fluorine | 4-Carboxy-phenylamino | Orange-red (492) |
| 235 | 4- | 2- | Fluorine | N-Methyl-N-(β-sulfo-ethyl)amino | Orange-red (485) |
| 236 | 3- | 2- | Fluorine | N-Methyl-N-(β-sulfo-ethyl)amino | Orange-red (495) |
| 237 | 4- | 2- | Fluorine | (Carboxy-methyl)-amino | Orange-red (488) |
| 238 | 4- | 2- | Fluorine | (Carboxy-methyl)-amino | Orange-red (496) |
| 239 | 4- | 2- | Fluorine | 4-(β-Sulfato-ethylsulfonyl)-phenylamino | Orange-red (492) |
| 240 | 3- | 2- | Fluorine | 4-(β-Sulfato-ethylsulfonyl)-phenylamino | Orange-red (493) |
| 241 | 4- | 2- | Fluorine | 3-(β-Sulfato-ethylsulfonyl)-phenylamino | Orange-red (489) |
| 242 | 3- | 2- | Fluorine | 3-(β-Sulfato-ethylsulfonyl)-phenylamino | Orange-red (492) |
| 243 | 4- | 2- | Fluorine | γ-(β'- | Orange-red (488) |

-continued

| | Azo compound of the formula (B) | | | | |
|---|---|---|---|---|---|
| Example | Sulfonyl radical in the ... -position | Triazinylamino group in the ... -position | Radical A | Radical R* | Color shade |
| 244 | 4- | 2- | Fluorine | Sulfatoethyl-sulfonyl)-propylamino | (493) |
| | | | | γ-(β'-Sulfatoethyl-sulfonyl)-propylamino | Orange-red (489) |

EXAMPLE 245

14 parts of trifluorotriazine are slowly added to a neutral solution of 19.5 parts of the sodium salt of aniline-3-sulfonic acid in about 320 parts of water at 0° C., a pH of 6 to 6.5 being maintained. A short time after the end of the addition, the reaction mixture is heated to 10° C., 18.8 parts of 1,3-diamino-benzene-4-sulfonic acid are then added and the second condensation reaction is carried out at a pH of between 6 and 6.5 at about 10° C. When this reaction has ended, the mixture is cooled to 0° C., the solution, prepared according to Example 1, of the diazonium of 26.6 parts of 4-(1,3-dichloro-isopropyl-sulfonyl)-aniline is added and the coupling reaction is brought to completion at a pH of about 3.5.

The azo compound according to the invention is salted out and isolated in the form of a dyestuff powder containing electrolyte. It has the following chemical structure:

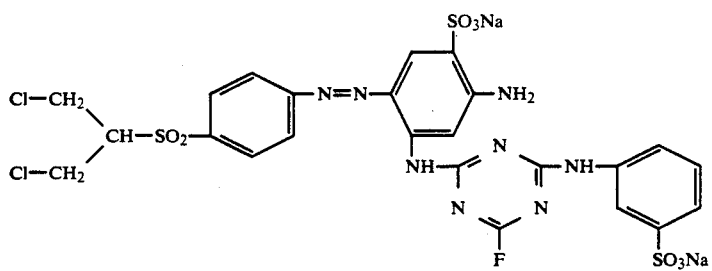

($\lambda_{max}$ = 512 nm)

The azo compound according to the invention has very good fiber-reactive dyestuff properties and gives, on the materials mentioned in the description, such as, in particular, cellulose fiber materials, for example cotton, after the application and fixing processes customary for fiber-reactive dyestuffs, golden yellow dyeings and prints having good fastness properties, of which the light fastnesses and light fastnesses when wet, such as light fastnesses under the influence of perspiration, can be singled out in particular.

EXAMPLES 246 TO 305

Further azo compounds according to the invention are described in the following Tabular Examples with the aid of the formula (C)

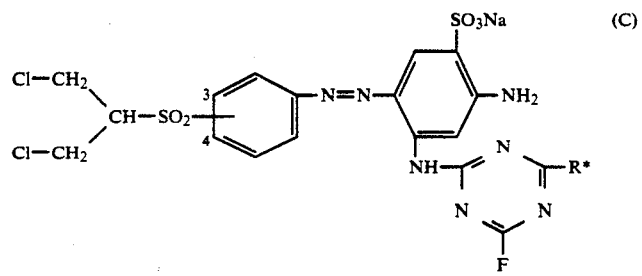

They can be prepared in the manner according to the invention, for example analogously to one of the above Embodiment Examples, from the starting compounds which can be seen from the formula in association with the data of the particular Tabular Example (a dichloroisopropyl-sulfonyl-aniline, the 1,3-Phenylenediamine-4-sulfonic acid, a halogeno-s-triazine, an amine corresponding to the formula H-R* and if appropriate cyanamide). They show very good fiber-reactive dyestuff properties and give, for example on cotton after the application and fixing processes customary in the art, deep, fast dyeings and prints having the color shade shown for the particular Tabular Example.

| | Azo compound of the formula (C) | | | |
|---|---|---|---|---|
| Example | Sulfonyl radical in the ... -position | Radical A | Radical R* | Color shade |
| 246 | 4- | Fluorine | 4-Sulfo-phenylamino | Golden yellow (400) |
| 247 | 3- | Fluorine | 4-Sulfo- | Golden |

-continued

Azo compound of the formula (C)

| Example | Sulfonyl radical in the ... -position | Radical A | Radical R* | Color shade |
|---|---|---|---|---|
| 248 | 4- | Fluorine | 3-Sulfo-phenylamino | Golden yellow (395) |
| 249 | 3- | Fluorine | 3-Sulfo-phenylamino | Golden yellow (400) |
| 250 | 4- | Fluorine | 2-Sulfo-phenylamino | Golden yellow (395) |
| 251 | 3- | Fluorine | 2-Sulfo-phenylamino | Golden yellow (401) |
| 252 | 4- | Fluorine | 2,5-Disulfo-phenylamino | Golden yellow (396) |
| 253 | 3- | Fluorine | 2,5-Disulfo-phenylamino | Golden yellow (403) |
| 254 | 4- | Fluorine | 4-Carboxy-phenylamino | Golden yellow (398) |
| 255 | 3- | Fluorine | 4-Carboxy-phenylamino | Golden yellow (403) |
| 256 | 4- | Fluorine | N-Methyl-N-(β-sulfo-ethyl)amino | Golden yellow (399) |
| 257 | 3- | Fluorine | N-Methyl-N-(β-sulfo-ethyl)amino | Golden yellow (406) |
| 258 | 3- | Fluorine | (Carboxy-methyl)-amino | Golden yellow (401) |
| 259 | 4- | Fluorine | (Carboxy-methyl)-amino | Golden yellow (405) |
| 260 | 4- | Fluorine | 4-(β-Sulfato-ethylsulfonyl)-phenylamino | Golden yellow (400) |
| 261 | 3- | Fluorine | 4-(β-Sulfato-ethylsulfonyl)-phenylamino | Golden yellow (400) |
| 262 | 4- | Fluorine | 3-(β-Sulfato-ethylsulfonyl)-phenylamino | Golden yellow (395) |
| 263 | 3- | Fluorine | 3-(β-Sulfato-ethylsulfonyl)-phenylamino | Golden yellow (403) |
| 264 | 4- | Fluorine | γ-(β'-Sulfatoethyl-sulfonyl)-propylamino | Golden yellow (398) |
| 265 | 4- | Fluorine | γ-(β'-Sulfatoethyl-sulfonyl)-propylamino | Golden yellow (407) |
| 266 | 4- | Chlorine | 4-Sulfo-phenylamino | Golden yellow (402) |
| 267 | 3- | Chlorine | 4-Sulfo-phenylamino | Golden yellow (402) |
| 268 | 4- | Chlorine | 3-Sulfo-phenylamino | Golden yellow (397) |
| 269 | 3- | Chlorine | 3-Sulfo-phenylamino | Golden yellow (402) |
| 270 | 4- | Chlorine | 2-Sulfo-phenylamino | Golden yellow (398) |
| 271 | 3- | Chlorine | 2-Sulfo-phenylamino | Golden yellow (404) |
| 272 | 4- | Chlorine | 2,5-Diulfo-phenylamino | Golden yellow (400) |
| 273 | 3- | Chlorine | 2,5-Disulfo-phenylamino | Golden yellow (403) (399) |
| 274 | 4- | Chlorine | 4-Carboxy-phenylamino | Golden yellow (405) |
| 275 | 3- | Chlorine | 4-Carboxy-phenylamino | Golden yellow (400) |
| 276 | 4- | Chlorine | N-Methyl-N-(β-sulfo-ethyl)amino | Golden yellow (408) |
| 277 | 3- | Chlorine | N-Methyl-N-(β-sulfo-ethyl)amino | Golden yellow (403) |
| 278 | 3- | Chlorine | (Carboxy-methyl)-amino | Golden yellow (407) |
| 279 | 4- | Chlorine | (Carboxy-methyl)-amino | Golden yellow (403) |
| 280 | 4- | Chlorine | 4-(β-Sulfato-ethylsulfonyl)-phenylamino | Golden yellow (401) |
| 281 | 3- | Chlorine | 4-(β-Sulfato-ethylsulfonyl)-phenylamino | Golden yellow (397) |
| 282 | 4- | Chlorine | 3-(β-Sulfato-ethylsulfonyl)-phenylamino | Golden yellow (403) |
| 283 | 3- | Chlorine | 3-(β-Sulfato-ethylsulfonyl)-phenylamino | Golden yellow (398) |
| 284 | 4- | Chlorine | γ-(β'-Sulfatoethyl-sulfonyl)-propylamino | Golden yellow (408) |
| 285 | 4- | Chlorine | γ-(β'-Sulfatoethyl-sulfonyl)-propylamino | Golden yellow (404) |
| 286 | 4- | Cyanoamido | 4-Sulfo-phenylamino | Golden yellow (409) |
| 287 | 3- | Cyanoamido | 4-Sulfo-phenylamino | Golden yellow (405) |
| 288 | 4- | Cyanoamido | 3-Sulfo-phenylamino | Golden yellow (410) |
| 289 | 3- | Cyanoamido | 3-Sulfo-phenylamino | Golden yellow (406) |
| 290 | 4- | Cyanoamido | 2-Sulfo-phenylamino | Golden yellow (408) |
| 291 | 3- | Cyanoamido | 2-Sulfo-phenylamino | Golden yellow (403) |
| 292 | 4- | Cyanoamido | 2,5-Diulfo-phenylamino | Golden yellow (408) |
| 293 | 3- | Cyanoamido | 2,5-Disulfo-phenylamino | Golden yellow (403) |
| 294 | 4- | Cyanoamido | 4-Carboxy-phenylamino | Golden yellow (409) |
| 295 | 3- | Cyanoamido | 4-Carboxy-phenylamino | Golden yellow (404) |
| 296 | 4- | Cyanoamido | N-Methyl-N-(β-sulfo-ethyl)amino | Golden yellow (410) |
| 297 | 3- | Cyanoamido | N-Methyl- | Golden |

-continued

| | Azo compound of the formula (C) | | | |
|---|---|---|---|---|
| Example | Sulfonyl radical in the ... -position | Radical A | Radical R* | Color shade |
| 298 | 3- | Cyanoamido | N-(β-sulfo-ethyl)amino (Carboxy-methyl)-amino | yellow (406) Golden yellow (411) |
| 299 | 4- | Cyanoamido | (Carboxy-methyl)-amino | Golden yellow (408) |
| 300 | 4- | Cyanoamido | 4-(β-Sulfato-ethylsulfonyl)-phenylamino | Golden yellow (407) |
| 301 | 3- | Cyanoamido | 4-(β-Sulfato-ethylsulfonyl)-phenylamino | Golden yellow (403) |
| 302 | 4- | Cyanoamido | 3-(β-Sulfato-ethylsulfonyl)-phenylamino | Golden yellow (408) |
| 303 | 3- | Cyanoamido | 3-(β-Sulfato-ethylsulfonyl)-phenylamino | Golden yellow (404) |
| 304 | 4- | Cyanoamido | γ-(β'-Sulfatoethyl-sulfonyl)-propylamino | Golden yellow (412) |
| 305 | 4- | Cyanoamido | γ-(β'-Sulfatoethyl-sulfonyl)-propylamino | Golden yellow (407) |

We claim:

1. An azo compound of the formula

in which
D° is a group of the formula

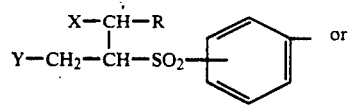

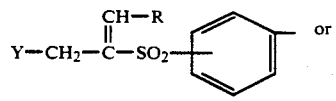

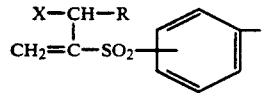

in which
Y is a substituent which is eliminated by alkali to form the vinyl group,
X is chlorine or bromine and
R is hydrogen, alkyl having 1 to 4 carbon atoms, phenyl or halogen; and
K° is a group of the formula

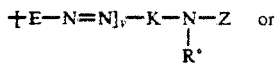

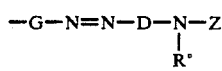

in which
R° is hydrogen or alkyl having 1 to 4 carbon atoms,
Z is a group of the formula

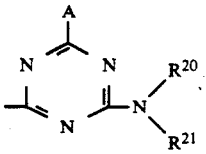

in which
A is halogen or cyanoamido,
R²⁰ is hydrogen or alkyl having 1 to 4 carbon atoms, or is alkyl having 1 to 4 carbon atoms, which is substituted by sulfo, carboxy, sulfato, phosphato, hydroxy, methoxy, ethoxy, phenyl, monosulfophenyl or disulfophenyl, or is alkyl having 1 to 6 carbon atoms, which is substituted by a group of the formula —SO₂—CH=CH₂ or —SO₂—CH₂—CH₂—Y¹, in which Y¹ has one of the meanings given above for Y or is the hydroxy group, or is alkyl having 2 to 8 carbon atoms, which is interrupted by 1 or 2 hetero groups chosen from the group consisting of the formulae —O—, —NH— and —N(R°)—, where R° has the abovementioned meaning, and which is unsubstituted or substituted by a group of the formula —SO₂—CH=CH₂ or —SO₂—CH₂—CH₂—Y¹ where Y¹ has the abovementioned meaning, and
R²¹ is hydrogen or alkyl having 1 to 4 carbon atoms, or is alkyl having 1 to 4 carbon atoms, which is substituted by sulfo, carboxy, sulfator phosphato, hydroxy, methoxy, ethoxy, phenyl, monosulfophenyl or disulfophenyl, or is cycloalkylene having 5 or 6 carbon atoms, which is unsubstituted or substituted by 1, 2 or 3 methyl groups, or is phenyl, which is unsubstituted or substituted by substituents selected from the group consisting of methyl, ethyl, methoxy, ethoxy, chlorine, sulfo and carboxy, or by 1 or 2 of these substituents and by 1 or 2 groups of the formula —SO₂—CH=CH₂ or —SO₂—CH₂—CH₂—Y¹ or by both, where Y¹ has the abovementioned meaning, or by 1 or 2 groups —SO₂—CH=CH₂, or —SO₂—CH₂—CH₂—Y¹or by both, or is alkyl having 1 to 6 carbon atoms, which is substituted by a group of the formula —SO₂—CH=CH₂ or —SO₂—CH₂—CH₂—Y¹, where Y¹ has the abovementioned meaning, or is alkyl having 2 to 8 carbon atoms, which is interrupted by 1 or 2 hetero groups chosen from the group consisting of the formulae —O—, —NH— and —N(R°)—, where R° has the abovementioned meaning, and which is unsubstituted or substituted by a group of the formula —SO₂—CH=CH₂ or —SO₂—CH₂—CH₂—Y¹, where Y¹ has the abovementioned meaning, or R²⁰ and R²¹, together with the nitrogen atom, form an N-piperidino, N-piperazino or N-morpholino 5- or 6-membered heterocyclic radical,
E is a group of the formula

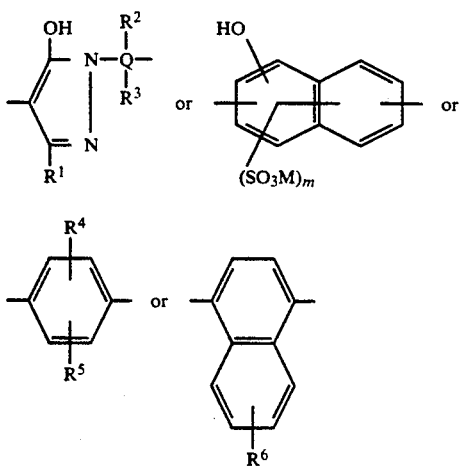

in which
R[1] is hydrogen, alkyl having 1 to 4 carbon atoms, cyano, carboxy, carbalkoxy having 2 to 5 carbon atoms, carbamoyl or phenyl,
Q is a benzene or naphthalene ring,
R[2] is hydrogen, alkyl having 1 to 4 carbon atoms, alkoxy having 1 to 4 carbon atoms, fluorine, bromine, chlorine, sulfo, carboxy, carbalkoxy having 2 to 5 carbon atoms, trifluoromethyl, carbamoyl or N-(C₁-C₄-alkyl)-carbamoyl, if Q is a benzene ring, or
R[2] is hydrogen or sulfo, if Q is a naphthalene ring,
R[3] is hydrogen, alkyl having 1 to 4 carbon atoms, alkoxy having 1 to 4 carbon atoms, chlorine or sulfo, if Q is a benzene ring, or is hydrogen or sulfo, if Q is a naphthalene ring,
R[4] is hydrogen, alkyl having 1 to 4 carbon atoms, alkoxy having 1 to 4 carbon atoms, bromine, chlorine, trifluoromethyl, sulfo, carboxy or cyano,
R[5] is hydrogen, alkyl having 1 to 4 carbon atoms, alkoxy having 1 to 4 carbon atoms, chlorine, amino, alkylamino having 1 to 4 carbon atoms, alkanoylamino having 2 to 5 carbon atoms, benzoylamino, ureido, N'-phenylureido, N'-(C₁-C₄-alkyl) -ureido. phenylsulfonyl or alkylsulfonyl having 1 to 4 carbon atoms,
R[6] is hydrogen or sulfo,
M is hydrogen or an alkali metal,
m is the number 1 or 2,
v is the number zero or 1 and
—K—N(R⁰)— is the bivalent radical of a water-soluble coupling component,
G is 1-amino-8-hydroxy-3,6- or -4,6-disulfonaphth-2,7-ylene or 1,3-phenylene, which is substituted by one hydroxy or by one amino and is not substituted by additional substituents or is additionally substituted by substituents selected from the group consisting of sulfo, alkyl having 1 to 4 carbon atoms, hydroxy and amino, or is 1,8-dihydroxy-3,6-or-4,6-dioulfo-naphth-2,7-ylene, and
D is a group of the formula

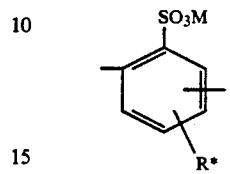

in which
M has one of the abovementioned meanings.

2. An azo compound as claimed in claim 1, in which R is hydrogen.
3. An azo compound as claimed in claim 1, in which A is fluorine.
4. An azo compound as claimed in claim 2, in which A is fluorine.
5. An azo compound as claimed in claim 2, in which A is chlorine.
6. An azo compound as claimed in claim 5, in which A is chlorine.
7. An azo compound as claimed in claim 1, in which Y is sulfato.
8. An azo compound as claimed in claim 1, in which Y is chlorine.
9. An azo compound as claimed in claim 2, in which Y is sulfato.
10. An azo compound as claimed in claim 3, in which Y is sulfato.
11. An azo compound as claimed in claim 5, in which Y is sulfato.
12. An azo compound as claimed in claim 2, in which Y is chlorine.
13. An azo compound as claimed in claim 3, in which Y is chlorine.
14. An azo compound as claimed in claim 5, in which Y is chlorine.
15. An azo compound as claimed in claim 1, in which D is a group of the formula

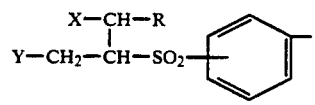

* * * * *